(12) United States Patent
Lent et al.

(10) Patent No.: US 8,943,203 B1
(45) Date of Patent: Jan. 27, 2015

(54) SYSTEM AND METHOD FOR STORAGE AND DEPLOYMENT OF VIRTUAL MACHINES IN A VIRTUAL SERVER ENVIRONMENT

(75) Inventors: Arthur F. Lent, Newton, MA (US); Peter M. Morrissette, Cary, NC (US); Timothy J. Clayton-Luce, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 1076 days.

(21) Appl. No.: 12/501,348

(22) Filed: Jul. 10, 2009

(51) Int. Cl.
*G06F 15/173* (2006.01)
*G06F 15/16* (2006.01)

(52) U.S. Cl.
USPC ............................ 709/226; 709/203; 709/219

(58) Field of Classification Search
USPC .......................................................... 709/226
See application file for complete search history.

(56) References Cited

U.S. PATENT DOCUMENTS

| | | | | |
|---|---|---|---|---|
| 5,634,096 | A * | 5/1997 | Baylor et al. | 714/6.24 |
| 6,389,432 | B1 * | 5/2002 | Pothapragada et al. | 1/1 |
| 6,567,774 | B1 * | 5/2003 | Lee et al. | 703/23 |
| 6,651,072 | B1 * | 11/2003 | Carino et al. | 1/1 |
| 6,757,778 | B1 * | 6/2004 | van Rietschote | 711/6 |
| 6,857,059 | B2 * | 2/2005 | Karpoff et al. | 711/209 |
| 6,880,058 | B2 * | 4/2005 | Mizuno et al. | 711/170 |
| 6,996,587 | B2 * | 2/2006 | Wagener et al. | 1/1 |
| 7,089,377 | B1 * | 8/2006 | Chen | 711/147 |
| 7,149,843 | B1 * | 12/2006 | Agesen et al. | 711/6 |
| 7,181,439 | B1 | 2/2007 | Lent et al. | |
| 7,383,378 | B1 | 6/2008 | Rajan et al. | |
| 7,437,507 | B2 * | 10/2008 | Sharma et al. | 711/114 |
| 7,467,268 | B2 * | 12/2008 | Lindemann et al. | 711/162 |
| 7,587,570 | B2 * | 9/2009 | Sarkar et al. | 711/170 |
| 7,810,092 | B1 * | 10/2010 | van Rietschote et al. | 718/1 |
| 7,849,169 | B2 * | 12/2010 | Haun et al. | 709/222 |
| 7,865,579 | B2 * | 1/2011 | Birse et al. | 709/221 |
| 7,877,545 | B2 * | 1/2011 | Sharma et al. | 711/114 |
| 7,941,602 | B2 * | 5/2011 | Burkey | 711/114 |
| 7,971,047 | B1 * | 6/2011 | Vlaovic et al. | 713/1 |
| 8,019,965 | B2 * | 9/2011 | Agombar et al. | 711/203 |
| 8,037,289 | B1 * | 10/2011 | Karnik et al. | 713/1 |
| 8,042,108 | B2 * | 10/2011 | Suwarna | 718/1 |
| 8,046,443 | B2 * | 10/2011 | Parker et al. | 709/220 |
| 8,056,076 | B1 * | 11/2011 | Hutchins et al. | 718/1 |

(Continued)

OTHER PUBLICATIONS

Liguori, ANthony and Hensbergen, Eric Van. "Experiences with COntent Addressable Storage and Virtual Disks," Workshop on I/O Virtualization, 2008.*

(Continued)

*Primary Examiner* — Melvin H Pollack
(74) *Attorney, Agent, or Firm* — Kacvinsky Daisak Bluni PLLC

(57) ABSTRACT

Described herein are systems and methods for storage and deployment of VMs in a virtual server environment. A VM deployment module executing on a server may produce VM container objects representing VMs, a VM container object comprising VM data describing a VM and vdisk configuration data. The VM deployment module may also later produce VMs on a server using the VM container objects. The VM deployment module may do so by producing a vdisk from a VM container object, the vdisk comprising the VM and vdisk configuration data. Rather than configuring the vdisk as typically done to make the vdisk useable to the server, the vdisk configuration data is used to make the vdisk useable and the VM data on the vdisk immediately accessible to the server. As such, the VM data may be immediately read to produce a VM on the server, thus providing rapid deployment of VMs.

19 Claims, 17 Drawing Sheets

(56) References Cited

U.S. PATENT DOCUMENTS

| | | | |
|---|---|---|---|
| 8,065,676 B1* | 11/2011 | Sahai et al. | 718/1 |
| 8,082,406 B1* | 12/2011 | Singh et al. | 711/162 |
| 8,087,017 B1* | 12/2011 | Whaley et al. | 718/1 |
| 8,140,812 B2* | 3/2012 | Arroyo et al. | 711/170 |
| 8,141,090 B1 | 3/2012 | Graupner et al. | 718/104 |
| 8,150,801 B2 | 4/2012 | Srivastava et al. | 707/609 |
| 8,156,373 B2* | 4/2012 | Zheng et al. | 714/15 |
| 8,166,477 B1* | 4/2012 | Tormasov | 718/1 |
| 8,201,166 B2 | 6/2012 | Garrett et al. | 718/1 |
| 8,205,194 B2* | 6/2012 | Fries et al. | 717/168 |
| 8,209,680 B1 | 6/2012 | Le et al. | 717/174 |
| 8,359,594 B1* | 1/2013 | Davidson et al. | 718/1 |
| 8,473,698 B2 | 6/2013 | Lionetti et al. | 711/162 |
| 8,489,741 B2 | 7/2013 | Chalasani et al. | 709/226 |
| 8,549,513 B2 | 10/2013 | Vinberg et al. | 717/174 |
| 8,612,566 B2 | 12/2013 | Ferris et al. | 709/223 |
| 8,619,775 B2* | 12/2013 | Amir et al. | 370/390 |
| 8,656,018 B1 | 2/2014 | Keagy et al. | 709/226 |
| 2006/0161808 A1* | 7/2006 | Burkey | 714/6 |
| 2006/0218360 A1* | 9/2006 | Burkey | 711/154 |
| 2006/0253669 A1* | 11/2006 | Lobdell | 711/162 |
| 2007/0067670 A1* | 3/2007 | Ebsen et al. | 714/7 |
| 2007/0239944 A1* | 10/2007 | Rupanagunta et al. | 711/147 |
| 2007/0283088 A1* | 12/2007 | Hannigan | 711/114 |
| 2008/0168228 A1* | 7/2008 | Carr et al. | 711/117 |
| 2008/0263306 A1* | 10/2008 | Tanizawa | 711/170 |
| 2009/0031097 A1* | 1/2009 | Nelson | 711/162 |
| 2009/0037680 A1* | 2/2009 | Colbert et al. | 711/162 |
| 2009/0113425 A1* | 4/2009 | Ports et al. | 718/1 |
| 2009/0282404 A1* | 11/2009 | Khandekar et al. | 718/1 |
| 2010/0011371 A1* | 1/2010 | Burkey | 718/105 |
| 2010/0082920 A1* | 4/2010 | Larson | 711/162 |
| 2010/0250880 A1* | 9/2010 | Mimatsu | 711/162 |
| 2010/0257326 A1* | 10/2010 | Otani et al. | 711/162 |
| 2010/0280996 A1* | 11/2010 | Gross et al. | 707/649 |
| 2010/0287348 A1* | 11/2010 | Sampathkumar | 711/162 |
| 2011/0047329 A1* | 2/2011 | O'Rourke et al. | 711/113 |
| 2011/0213927 A1* | 9/2011 | Tucci | 711/114 |
| 2011/0231899 A1* | 9/2011 | Pulier et al. | 726/1 |
| 2012/0290702 A1* | 11/2012 | Vincent | 709/223 |
| 2013/0179673 A1* | 7/2013 | Innes et al. | 713/2 |
| 2013/0275375 A1* | 10/2013 | Nickolov et al. | 707/636 |
| 2013/0290960 A1* | 10/2013 | Astete et al. | 718/1 |
| 2013/0298125 A1* | 11/2013 | Hutchins et al. | 718/1 |

OTHER PUBLICATIONS

Singh, Aameek et al. "Server-Storage Virtualization: Integration and Load Balancing in Data Centers," Proceedings of the 2008 ACM/IEEE Conference on Supercomputing, Article No. 53, 2008.*

Valdez, E. et al. "Retrofitting the IBM Power Hypervisor to Support Mandatory Access Control," 23rd Annual Computer Security Applications Conference (ACSAC), Dec. 14, 2007, pp. 221-231.*

Gebhardt, C. and Tomlinson, A. "Secure Virtual Disk Images for Grid Computing," Third Asia Pacific Trusted Infrastructure Technologies Conference (APTC), Oct. 2008, pp. 19-29.*

* cited by examiner

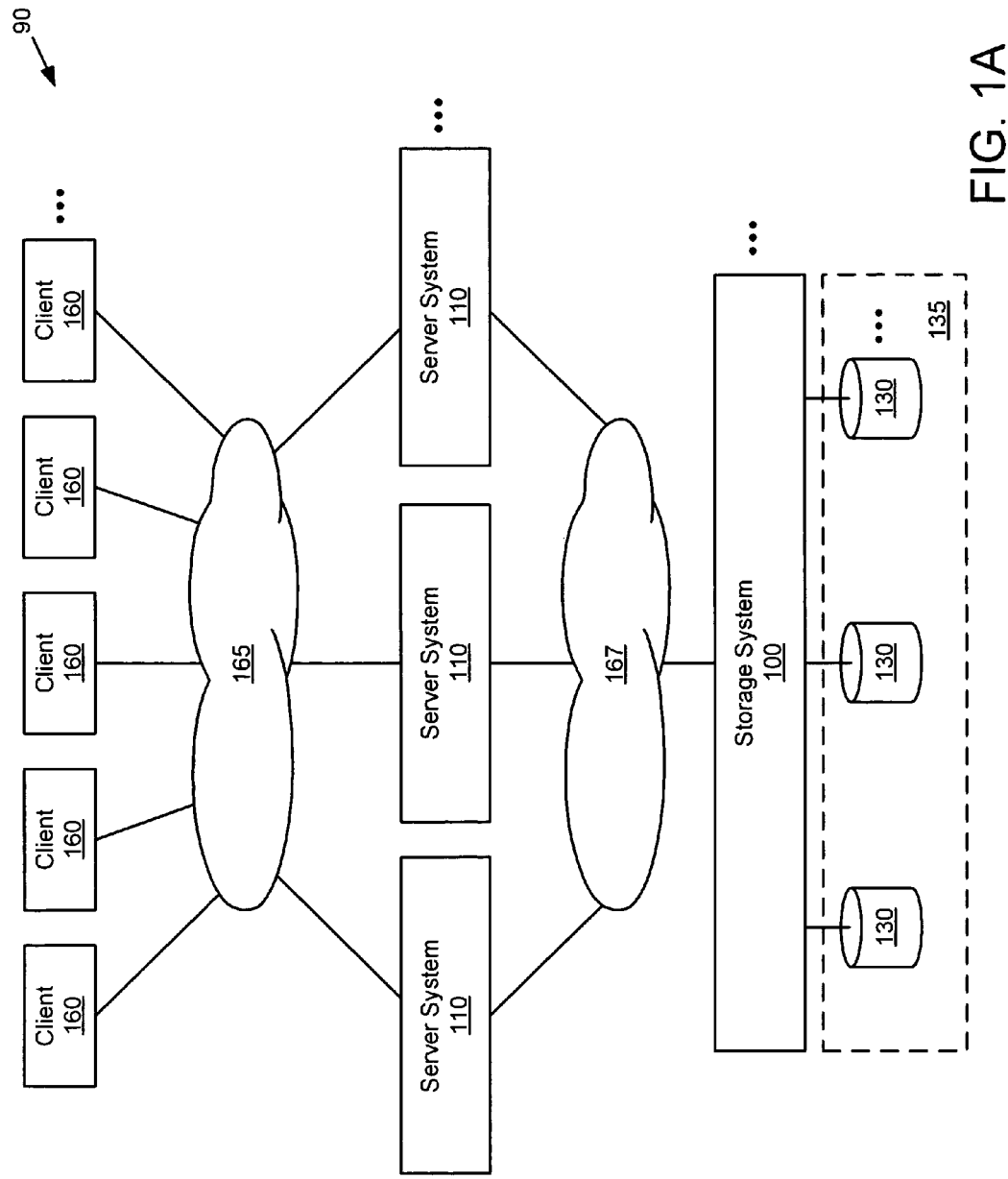

SYSTEM AND METHOD FOR STORAGE AND DEPLOYMENT OF VIRTUAL MACHINES IN A VIRTUAL SERVER ENVIRONMENT

FIELD OF THE INVENTION

The present invention relates to virtual server environments and, more specifically, to storage and deployment of virtual machines in a virtual server environment.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The storage system may be further configured to allow many server systems to access shared resources, such as files, stored on storage devices of the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow servers to remotely access the information (files) on the storage system. The servers typically communicate with the storage system by exchanging discrete frames or packets of data according to pre-defined protocols, such as the Transmission Control Protocol/Internet Protocol (TCP/IP).

NAS systems generally utilize file-based access protocols; therefore, each server may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the storage system may be enhanced for networking servers.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the server requesting the information maintains file mappings and manages file semantics, while its requests (and server responses) address the information in terms of block addressing on disk using, e.g., a logical unit number (LUN). Some SAN arrangements utilize storage systems that implement virtual disks (vdisks), which are encapsulated data containers stored within a file system.

In multi-protocol storage systems that utilize both block-based and file-protocols, typically the block-based protocol utilizes a high-speed transport mechanism, such as Fibre Channel (FC) or InfiniBand (IB). Conversely, file-based protocol connections often utilize, for example, the NFS protocol operating over TCP/IP. The file-based systems typically include additional network overhead due to the nature of the file-based protocols, e.g., NFS or User Datagram Protocol (UDP), involved. This additional network overhead, from, for example, file mapping and management of file semantics, significantly reduces the data throughput available over the file-based protocol network connection.

Users typically desire the ease of use of a file-based protocol, especially the use of the file-based protocol namespace wherein the files are referenced through a conventional drive/volume/path/file name mechanism. In contrast, in a SAN or other block-based environment, data is accessed by reference to a set number of blocks spread among the disks storing the data for the data set, which imposes a greater administrative burden on a user for using SAN-based systems. However, a noted disadvantage of the use of the file-based protocols is the above-mentioned additional network overhead required for the use of such protocols. This additional network overhead makes the use of these file-based protocols impractical for certain high-performance and data-intensive transfer operations, such as database management systems (DBMS). Many users thus desire the ease of use of a file-based protocol namespace, while needing the high-speed data throughput available from a block-based protocol.

A virtual server environment may typically include multiple physical servers accessing the storage system having multiple storage devices for storing client data. Each server may include multiple virtual machines (VMs) that reside and execute on the server. Each VM (sometimes referred to as a virtual server or virtual desktop) may comprise a separate encapsulation or instance of a separate operating system and one or more applications that execute on the server. As such, each VM on a server may have its own operating system and set of applications and function as a self-contained package on the server and multiple operating systems may execute simultaneously on the server.

Each VM on a server may be configured to share the hardware resources of the server. Each server may include a VM monitor module/engine (sometimes referred to as a hypervisor module/engine) that executes on the server to produce and manage the VMs. The VM monitor module/engine (hypervisor) may also virtualize the hardware and/or software resources of the servers for use by the VMs. The operating system of each VM may utilize and communicate with the resources of the server via the VM monitor/hypervisor engine. The virtual server environment may also include a plurality of clients connected with each server for accessing client data stored on the storage system. Each client may connect and interface/interact with a particular VM of a server to access client data of the storage system. From the viewpoint of a client, the VM may comprise a virtual server that appears and behaves as an actual physical server or behaves as an actual desktop machine. For example, a single server may by "virtualized" into 1, 2, 4, 8, or more virtual servers or virtual desktops, each running their own operating systems, and each able to support one or more applications.

A storage system may be configured to allow servers to access its data, for example, to read or write data to the storage system. A server may execute an application that "connects" to the storage system over a computer network such as a shared local area network (LAN), a wide area network (WAN), or a virtual private network (VPN) implemented over a public network such as the Internet. The application may send an access request (read or write request) to the storage system for accessing particular data stored on the storage system. Each server may also include multiple VMs, each VM being used by and connected with a client through a computer network. Each VM may also execute an application for sending read/write requests (received from the connected client) for accessing data on the storage system. The VM applications executing on the server may service the connected clients by receiving the client access requests and submitting the access requests to the storage system for execution.

There are several advantages in implementing VMs on a server. Having multiple VMs on a single server enables multiple clients to use multiple different operating systems executing simultaneously on the single server. Also, multiple VMs executing their own applications may be logically separated and isolated within a server to avoid conflicts or interference between the applications of the different VMs. As each VM is separated and isolated from other VMs, a security issue or application crash in one VM does not affect the other VMs on the same server. Also, VMs can rapidly and seamlessly be shifted from one physical server to any other server, and optimally utilize the resources without affecting the applications. Such a virtualization of the servers, and/or virtualization of the storage network environment, allows for efficiency and performance gains to be realized.

Each VM may be represented by data that describes the VM (referred to herein as "VM data"). VM data for a VM may be used for later producing and deploying the VM on a server. VM data for multiple VMs need to be stored efficiently with minimal use of valuable storage resources. Also, the VM data should be stored in way that allows for fast deployment of the VMs on a server when needed.

SUMMARY OF THE INVENTION

Described herein are systems and methods for storage and deployment of VMs in a virtual server environment. In some embodiments, a VM deployment module/engine residing and executing on a server may perform (or cause to be performed) a "staging technique" to produce VM container objects representing VMs, a VM container object comprising VM data describing a VM and vdisk configuration data. The VM deployment module may also perform (or cause to be performed) a "deployment technique" to later deploy/produce VMs on a server using VM container objects produced by the staging technique. The VM deployment module may do so by producing a vdisk from a VM container object, the vdisk comprising the VM and vdisk configuration data. Rather than configuring (e.g., partitioning and formatting) the vdisk as typically done to make the vdisk useable to the server, the vdisk configuration data is used and read by the server operating system to make the vdisk useable and make the VM data on the vdisk immediately accessible to the server. As such, the VM data may be immediately imported to produce a VM on the server, thus providing rapid deployment of VMs on servers.

In the staging technique, a server may produce and store VM data for one or more VMs, VM data representing and describing a VM (e.g., specifying hardware and/or software resources used by the VM on the server and/or storage system). Upon initiation of the staging technique for a particular VM, an empty VM container object (e.g., container file) for VM data of the VM is produced on the storage system. A vdisk is then produced from the empty VM container file on the storage system using a file to vdisk conversion process. The vdisk is then exported and mapped from the storage system to the server and the server brings the vdisk online.

The server then configures the vdisk by partitioning and formatting the vdisk to make the vdisk useable by the server operating system so data and files may be stored to and read from the vdisk. Formatting of the vdisk may include providing a file system on the vdisk that will allow the server operating system to use to store and read files from the vdisk. The end result of the configuring operations (partitioning and formatting) on the vdisk may be described/specified by data that describes the resulting configuration of the vdisk (i.e., the result of each configuring operation on the vdisk), referred to herein as "vdisk configuration data." After configuring the vdisk, the server operating system may store the vdisk configuration data to the vdisk. Typically any data stored in the vdisk is typically reflected in and made accessible through the corresponding VM container file used to produce the vdisk. In general then, the vdisk 515 and corresponding VM container file may each be considered as containing the vdisk configuration data, since accessing either the vdisk or the VM container file will provide access to the vdisk configuration data. The VM data stored on the server is then copied to the vdisk, which is then also reflected and accessible through the corresponding VM container file on the storage system.

The vdisk then unmaps and destroys/removes the vdisk on the storage system. The VM container file, however, does not get destroyed and remains in the storage system, the VM container file containing the VM data for the VM and the vdisk configuration data (or contains meta-data pointers to such data). As such, the VM data for the VM and the vdisk configuration data is still accessible through the VM container file for using later to quickly deploy the VM in the deployment technique. Typically there is a limited number of vdisks that can exist in the volume at the same time. As such, by destroying/removing the vdisk and storing the VM data and the vdisk configuration data on a container file, the number of allowed vdisks on the volume are not used by the staging technique and valuable storage resources are not consumed unnecessarily on the storage system.

A deployment technique may be used to produce VMs on a server using the VM container objects representing VMs (that were produced in the staging technique). Upon initiation of the deployment technique for a particular VM that is represented by a particular VM container file (containing VM data and vdisk configuration data), a new vdisk is produced from the VM container file on the storage system using a file to vdisk conversion process. In producing the new vdisk from the VM container file, the data contents of the VM container file are copied to the vdisk. Thus the vdisk will also contain the VM data and vdisk configuration data. The vdisk is then exported and mapped from the storage system to the server and the server brings the vdisk online.

In some embodiments, however, configuring of the vdisk by the server operating system is omitted. Configuring of the vdisk by the server operating system is typically done to make the vdisk useable by the server operating system (so data and files may be stored to and read from the vdisk). Rather, in these embodiments, the vdisk configuration data contained in the vdisk is used to make the vdisk useable by the server operating system so that configuration operations on the vdisk may be omitted. As such, the VM data on the vdisk may be immediately accessible by the server operating system and used for rapidly deploying the VM. The VM may then be produced on the server using the VM data to make the VM visible on the server and ready for client usage. As such, the VM data may be read immediately from the vdisk without waiting for the server operating system to configure the vdisk (by using the vdisk configuration data).

BRIEF DESCRIPTION OF THE DRAWINGS

The novel features are set forth in the appended claims. However, for purpose of explanation, several embodiments of the invention are set forth in the following figures.

FIG. 1A is a block diagram of an exemplary virtual server environment in which some embodiments operate;

DETAILED DESCRIPTION

Figure 1B:
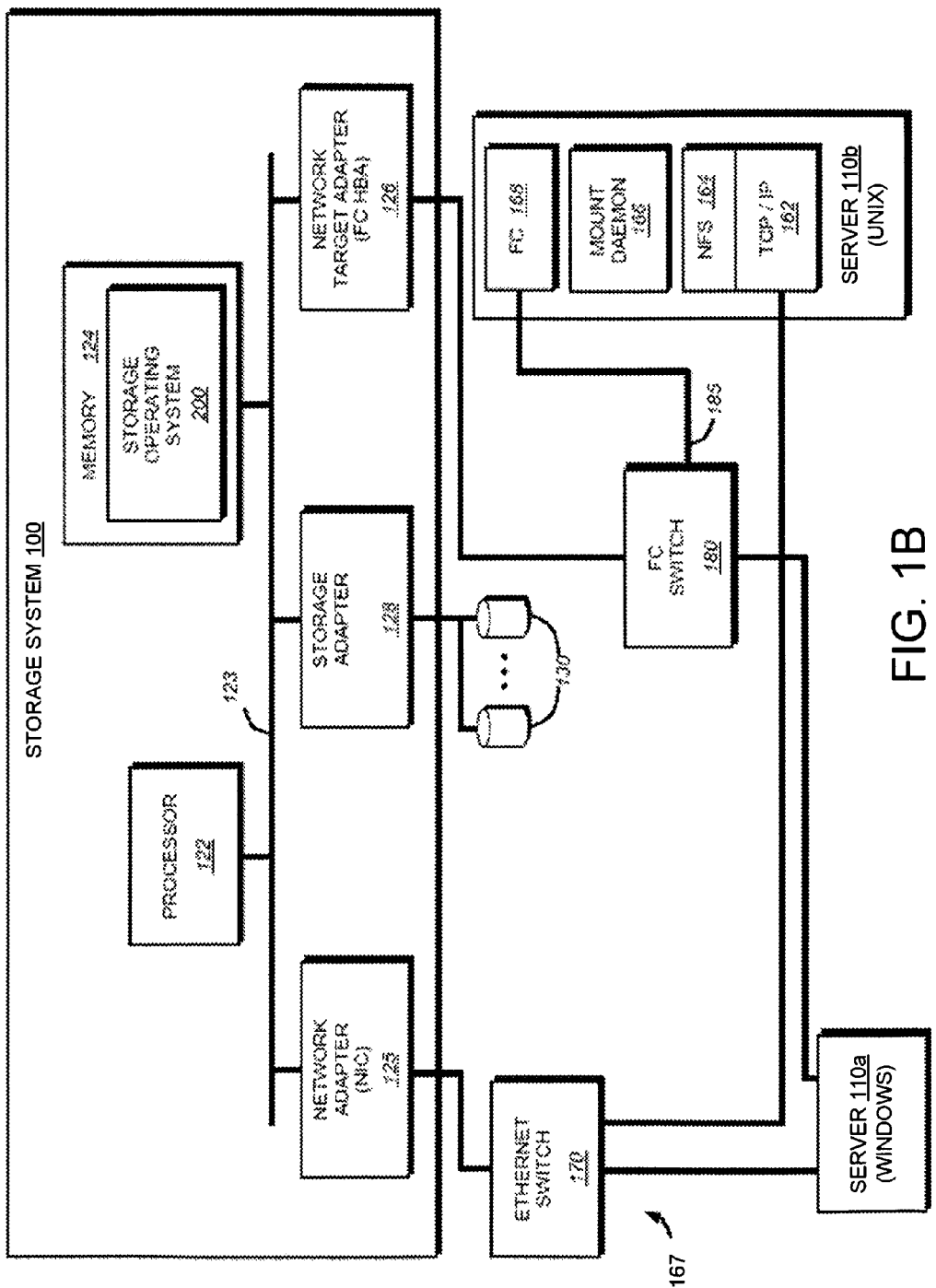
FIG. 1B is a schematic block diagram of a multi-protocol storage system used in some embodiments.

In the following description, numerous details are set forth for purpose of explanation. However, one of ordinary skill in the art will realize that the embodiments described herein may be practiced without the use of these specific details. In other instances, well-known structures and devices are shown in block diagram form in order to not obscure the description with unnecessary detail.

The description that follows is divided into four sections. Section I describes a virtual server environment in which some embodiments operate. Section II describes a system for storage and deployment of VMs in virtual server environments. Section III describes a staging technique for producing VM container objects. Section IV describes a deployment technique for producing VMs using VM container objects.

I. Virtual Server Environment

FIG. 1A is a block diagram of an exemplary virtual server environment 90 in which some embodiments operate. The environment 90 comprises a set of two or more server systems 110 connected to one or more client systems 160 via a network 165. The server systems 110 may each access one or more storage systems 100 that are connected to the server systems 110 via a network 167. A storage system 100 may comprise a set of storage devices 130 for storing client data, the storage devices 130 comprising a shared storage 135 of the storage system 100. Note that the server systems 110 are also connected to each other (e.g., via network 165 or network 167) for communicating with each other (e.g., for working collectively to provide data-access service to the client systems 160 and for collectively hosting a plurality of virtual machines as described herein).

A client system 160 may comprise a computer system that may execute a client application that interacts with a server system 110 for submitting configuration and/or read/write access requests and for receiving or transmitting data from or to the server systems 110 over the network 165. In a virtual server environment, a client system 160 may comprise a terminal that may execute a client terminal application that interacts over the network 165 with one or more virtual machines (VMs) executing on a server system 110 for submitting configuration and/or read/write access requests and for receiving or transmitting data from or to the storage system 100 over the network 167. A user may interface with the client application (e.g., through a user interface of the client application) to submit configuration and/or access requests.

A server system 110 may comprise a computer system that may execute a server application that interacts with the client systems 160 for receiving configuration and/or read/write access requests from, and for receiving or transmitting data from or to the client systems 160 over the network 165. A server system 110 may be connected to the client systems 160 over a network 165 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110, each server system 110 hosting multiple client systems embodied as virtual machines, one virtual machine per each client system 160. The network 165 and/or subnets of networks 165 may be physically embodied within such a chassis.

A server application executing on a server system 110 may provide data-access services to client systems 160 by receiving and processing access requests from the client systems 160 for data from the storage system(s) 100. In turn, a server application utilizes the services of the storage system 100 to access, store, and manage data in a set of storage devices 130. A storage system 100 may be coupled locally to a server system 110 over a network 167 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110 within a single chassis (e.g., a blade server chassis), with each instance of a server system 110 in communication with each other instance of a server system 110 in the chassis via network 167.

Interaction between the server systems 110 and the storage system(s) 100 can enable the provision of storage services. That is, the server systems 110 may request the services of the storage system(s) 100 (by submitting configuration and/or read/write access requests), and the storage system(s) 100 may respond to configuration and/or read/write access requests of the server systems 110 by receiving or transmitting data to the server systems 110 over the network 167 (e.g., by exchanging data packets through a connection over the network 167).

Communications between a storage system 100 and any of server systems 110 are typically embodied as packets sent over the computer network 167. A server system 110 may send an access request (a configuration and/or read/write access request) to the storage system 100 for accessing particular data stored on the storage system. The server system 110 may request the services of the storage system 100 by issuing storage-access protocol messages formatted in accordance with a conventional storage-access protocol for accessing storage devices (such as CIFS, NFS, etc.). Access requests (e.g., configuration and/or read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the server system 110 may issue access requests by issuing packets using block-based access protocols—such as the Fibre Channel Protocol (FCP), or Internet Small Computer System Interface (iSCSI) Storage Area Network (SAN) access—when accessing data in the form of blocks.

A server system 110 utilizes services of a storage system 100 to store and manage data. The storage system 100 may comprise a computer system that stores data in a set of one or more storage devices 130. A storage device 130 may comprise writable storage device media such as disk devices, video tape, optical devices, DVD, magnetic tape, flash memory, Magnetic Random Access Memory (MRAM), Phase Change RAM (PRAM), or any other similar media adapted to store information (including data and parity information).

As known in the art, a storage device 130 may have one or more storage volumes, where each volume has a file system implemented on the volume. A file system implemented on the storage devices 130 may provide multiple directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical units (LUs).

A. Multi-Protocol Storage System

FIG. 1B is a schematic block diagram of a multi-protocol storage system 100 configured to provide storage service relating to the organization of information on storage devices, such as disks 130. The storage system 100 is illustratively embodied as a storage system comprising a processor 122, a memory 124, a plurality of network adapters 125, 126 and a storage adapter 128 interconnected by a system bus 123. The multi-protocol storage system 100 also includes a storage operating system 200 that provides a virtualization system (and, in particular, a file system) to logically organize the information as a hierarchical structure of named directory, file and virtual disk (vdisk) storage objects on the disks 130.

Whereas servers of a NAS-based network environment have a storage viewpoint of files, the servers of a SAN-based network environment have a storage viewpoint of blocks or disks. To that end, the multi-protocol storage system 100 presents (exports) disks to SAN servers through the creation of vdisk objects. A vdisk object (hereinafter "vdisk") is a special file type that is implemented by the virtualization system and translated into an emulated disk as viewed by the SAN servers. The multi-protocol storage system thereafter makes these emulated disks accessible to the SAN servers through controlled exports, as described further herein. A vdisk may also be referred to as a logical unit (LU) having an associated logical unit number (LUN) that uniquely identifies the vdisk/LU within a volume of the storage system. In some embodiments, a volume may only contain a limited number of vdisks/LUs up to a maximum number of allowed vdisks/LUs.

In the illustrative embodiment, the memory 124 comprises storage locations that are addressable by the processor and adapters for storing software program code and data structures. The processor and adapters may, in turn, comprise processing elements and/or logic circuitry configured to execute the software code and manipulate the various data structures. The storage operating system 200, portions of which are typically resident in memory 124 and executed by the processing elements, functionally organizes the storage system by, inter alia, invoking storage operations in support of the storage service implemented by the storage system. It will be apparent to those skilled in the art that other processing and memory implementations, including various computer readable media, may be used for storing and executing program instructions pertaining to the inventive system and method described herein.

The network adapter 125 couples the storage system to a plurality of servers 110a,b over point-to-point links, wide area networks, virtual private networks implemented over a public network (Internet) or a shared local area network, hereinafter referred to as an illustrative Ethernet network 167. Therefore, the network adapter 125 may comprise a network interface card (NIC) having the mechanical, electrical and signaling circuitry needed to connect the storage system to a network switch, such as a conventional Ethernet switch 170. For this NAS-based network environment, the servers are configured to access information stored on the multi-protocol storage system as files. The servers 110 communicate with the storage system over network 167 by exchanging discrete frames or packets of data according to pre-defined protocols, such as the Transmission Control Protocol/Internet Protocol (TCP/IP).

The servers 110 may be general-purpose computers configured to execute applications over a variety of operating systems, including the UNIX® and Microsoft Windows® operating systems. Server systems generally utilize file-based access protocols when accessing information (in the form of files and directories) over a NAS-based network. Therefore, each server 110 may request the services of the storage system 100 by issuing file access protocol messages (in the form of packets) to the storage system over the network 167. For example, a server 110a running the Windows operating system may communicate with the storage system 100 using the Common Internet File System (CIFS) protocol. On the other hand, a server 110b running the UNIX operating system may communicate with the multi-protocol storage system using the Network File System (NFS) protocol 164 over TCP/IP 162. It will be apparent to those skilled in the art that other servers running other types of operating systems may also communicate with the integrated multi-protocol storage system using other file access protocols.

The storage network "target" adapter 126 also couples the multi-protocol storage system 100 to servers 110 that may be further configured to access the stored information as blocks or disks. For this SAN-based network environment, the storage system is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the storage system 100 to a SAN network switch, such as a conventional FC switch 180. In addition to providing FC access, the FC HBA may offload fibre channel network processing operations for the storage system.

The servers 110 generally utilize block-based access protocols, such as the Small Computer Systems Interface (SCSI) protocol, when accessing information (in the form of blocks, disks or vdisks) over a SAN-based network. SCSI is an input/output (I/O) interface with a standard, device independent protocol that allows different peripheral devices, such as disks 130, to attach to the storage system 100. In SCSI terminology, servers 110 operating in a SAN environment are initiators that initiate requests and commands for data. The multi-protocol storage system is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage system 100 supports various SCSI-based protocols used in SAN deployments, including SCSI encapsulated over TCP (iSCSI), SCSI encapsulated over FC (FCP), and Fibre Channel Over Ethernet (FCoE). The initiators (hereinafter servers 110) may thus request the services of the target (hereinafter storage system 100) by issuing iSCSI and FCP messages over the network 167, 185 to access information stored on the disks. It will be apparent to those skilled in the art that the servers may also request the services of the integrated multi-protocol storage system using other block access protocols. By supporting a plurality of block access protocols, the multi-protocol storage system provides a unified and coherent access solution to vdisks/LUs in a heterogeneous SAN environment.

The storage adapter 128 cooperates with the storage operating system 200 executing on the storage system to access information requested by the servers. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the servers.

Storage of information on the storage system 100 is preferably implemented as one or more storage volumes that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

In accordance with an illustrative embodiment of the present invention, a server 110b includes various software layers or modules executing thereon. For example, the server 110b may be executing a Network File System (NFS) layer 164 that implements the NFS protocol and cooperates with a TCP/IP layer 162 to enable the server to access files stored on the storage system using the NFS protocol. The server 110b may also include a Fibre Channel (FC) driver 168 for communicating with the storage system utilizing the Fibre Channel protocol.

A server 110b may also execute, in an illustrative embodiment, a mount daemon 166 which interacts with the storage operating system 200 of the storage system 100 to enable transparent access to blocks, such as vdisks, stored on a storage system using a file-based protocol such as NFS. The mount daemon 166 operates in conjunction with the NFS Proxy layer, described further below, to provide appropriate device addresses to the storage system 100. The mount daemon 166 may be implemented as a background process, thread or may be a remotely callable library of procedures that performs the various functionality described below. A method and apparatus for allowing a server transparent access to blocks, such as vdisks, stored on a storage system using a file-based protocol is further described in U.S. Pat. No. 7,181,439, entitled SYSTEM AND METHOD FOR TRANSPARENTLY ACCESSING A VIRTUAL DISK USING A FILE-BASED PROTOCOL, by Lent et al., the contents of which are hereby incorporated by reference. The process of allowing a server transparent access to a vdisk using a file-based protocol may sometimes be referred to herein as "transparent access process/technique."

It should be noted that the software layers that are shown for server 110b are exemplary only and that they may be varied without departing from the spirit and scope of the invention. Additionally, it should be noted that the NFS layer 164 is shown for exemplary purposes only. Any file-based protocol may be utilized in accordance with the teachings of the present invention, including, for example CIFS.

B. Storage System Operating System

To facilitate access to the disks 130, the storage operating system 200 implements a write-anywhere file system of a virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN storage system approach to storage by enabling file-based (NAS) access to the named files and directories, while further enabling block-based (SAN) access to the named vdisks on a file system based storage platform. The file system simplifies the complexity of management of the underlying physical storage in SAN deployments.

As noted, a vdisk is a special file type in a volume that derives from a normal (regular) file, but that has associated export controls and operation restrictions that support emulation of a disk. Unlike a file that can be created by a server using, e.g., the NFS or CIFS protocol, a vdisk is created on the multi-protocol storage system via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow LUNs and exports to persist over, e.g., reboot operations, while also enabling management of the vdisk as a single disk object in relation to NAS servers.

In the illustrative embodiment, the storage operating system 200 may comprise Data ONTAP® storage operating system, available from NetApp, Inc. of Sunnyvale, Calif., which implements a Write Anywhere File Layout (WAFL®) file system. However, it is expressly contemplated that any appropriate storage operating system, including a write in-place file system, may be enhanced for use in accordance with embodiments described herein. As such, where the term "WAFL" is employed, it should be taken broadly to refer to any storage operating system that is otherwise adaptable to the teachings of this embodiment.

As used herein, the term "storage operating system" generally refers to the computer-executable code operable on a computer that manages data access and may, in the case of a multi-protocol storage system, implement data access semantics, such as the Data ONTAP® storage operating system, which is implemented as a microkernel. The storage operating system can also be implemented as an application program operating over a general-purpose operating system, such as UNIX® or Windows®, or as a general-purpose operating system with configurable functionality, which is configured for storage applications as described herein.

In addition, it will be understood to those skilled in the art that the inventive system and method described herein may apply to any type of special-purpose (e.g., storage serving storage system) or general-purpose computer, including a standalone computer or portion thereof, embodied as or including a storage system. Moreover, the teachings of this embodiment can be adapted to a variety of storage system architectures including, but not limited to, a network-attached storage environment, a storage area network and disk assembly directly-attached to a server or host computer. The term "storage system" should therefore be taken broadly to include such arrangements in addition to any subsystems configured to perform a storage function and associated with other equipment or systems.

Figure 2:
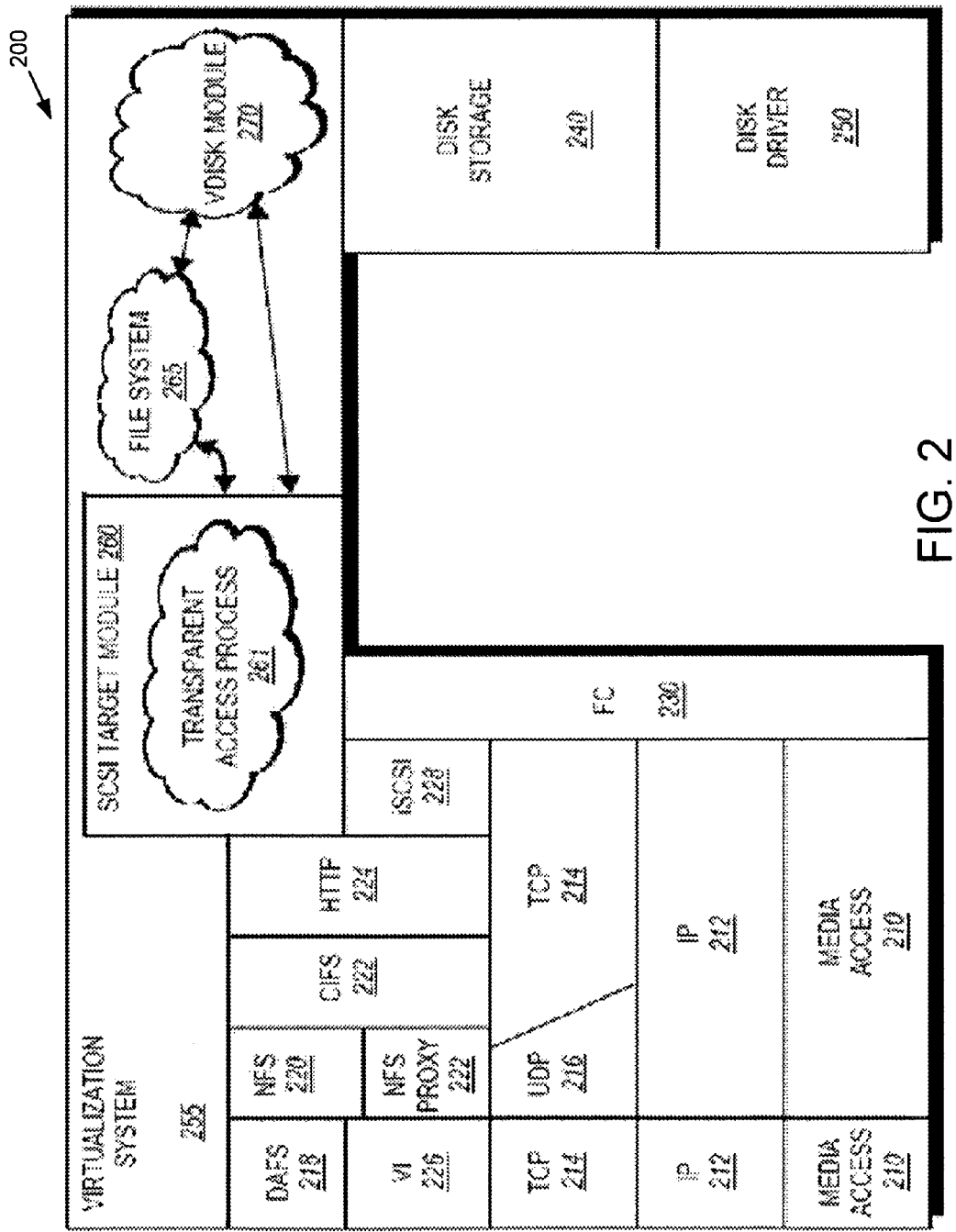
FIG. 2 is a schematic block diagram of an exemplary storage operating system used in some embodiments.

FIG. 2 is a schematic block diagram of an exemplary storage operating system 200 used in some embodiments. The storage operating system comprises a series of software layers organized to form an integrated network protocol stack or, more generally, a multi-protocol engine that provides data paths for servers to access information stored on the multi-protocol storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as remote direct memory access (RDMA), as required by the DAFS protocol 218.

The file system protocol layer also includes, in the illustrative embodiment a NFS proxy layer 222. In some embodiments, the NFS proxy layer 222 examines each NFS Open or look up commands received from a server to determine if the command is to utilize the transparent access technique. The NFS proxy layer 222 performs this function by examining the filename field of the received Open command, described further below. It should be noted that an NFS proxy layer is shown for exemplary purposes only. The teachings of the present embodiment may be utilized with any file-based protocol including, for example CIFS or HTTP. In such alternate embodiments, an appropriate proxy layer would be implemented within the storage operating system.

An iSCSI driver layer 228 provides block protocol access over the TCP/IP network protocol layers, while a FC driver layer 230 operates with the FC HBA 126 to receive and transmit block access requests and responses to and from the integrated storage system. The FC and iSCSI drivers provide FC-specific and iSCSI-specific access control to the LUs (vdisks) and, thus, manage exports of vdisks to either iSCSI or FCP or, alternatively, to both iSCSI and FCP when accessing a vdisk on the multi-protocol storage system. In addition, the storage operating system includes a disk storage layer 240 that implements a disk storage protocol, such as a RAID protocol, and a disk driver layer 250 that implements a disk access protocol such as, e.g., a SCSI protocol.

C. Transparent Access Process Components of Storage Operating System

Bridging the disk software layers with the integrated network protocol stack layers is a virtualization system 255. The virtualization system 255 is implemented, in the illustrative embodiment, by a file system 265 cooperating with virtualization modules illustratively embodied as, e.g., vdisk module 270 and SCSI target module 260. It should be noted that the vdisk module 270, file system 265 and SCSI target module 260 can be implemented in software, hardware, firmware, or a combination thereof.

The vdisk module 270 interacts with the file system 265 to provide a data path from the block-based SCSI target module to blocks managed by the file system. In essence, the vdisk module 270 manages SAN deployments by, among other things, implementing a comprehensive set of vdisk (LU) commands that are converted to primitive file system operations ("primitives") and that interact with the file system 265 and the SCSI target module 260 to implement the vdisks.

The SCSI target module 260, in turn, initiates emulation of a disk or LU by providing a mapping procedure that translates logical block access to LUs specified in access requests into virtual block access to the special vdisk file types and, for responses to the requests, vdisks into LUs. The SCSI target module is illustratively disposed between the iSCSI and FC drivers 228, 230 and the file system 265 to thereby provide a translation layer of the virtualization system 255 between the SAN block (LU) space and the file system space, where LUs are represented as vdisks.

In addition, the SCSI target module 260 includes one or more transparent access processes 261. The transparent access processes 261, described further below, enable servers to transparently access a vdisk by utilizing a file-based protocol. These transparent processes 261 cooperate with the mount daemon 166 executing on the server to implement the novel system and method for transparently accessing vdisks using a file-based protocol.

The file system 265 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

D. Transparent Access Process

As described above, the transparent access process/technique may enable a server application to issue a file-based protocol Open command and transparently access a virtual disk stored on a storage system using a block-based protocol. The server may utilize the convenient namespace of the file-based protocol, while obtaining the performance benefits of the high-speed data access path associated with the vdisk. The server may execute a mount daemon 166 that interacts with a NFS proxy layer 222 (or other file-based protocol proxy layer) executing on the storage system 100.

The transparent access is initiated by prepending a predetermined and special prefix to a filename contained in an Open command sent through the file-based protocol. The NFS proxy layer 222, executing within the storage operating system 200 of the storage system, identifies that the Open command is directed to a filename that contains the predetermined prefix and initiates the transparent access process (file to vdisk conversion). The NFS proxy layer 222, in conjunction with the SCSI target module 260 of the storage operating system, ensures that the file requested to be opened is represented as a vdisk which is exported to the requesting server. If the file to be opened is not already a vdisk, the procedure also converts it to one using conventional file to vdisk conversion routines. The storage system 100 then communicates with the mount daemon 166 executing on the server 110. The mount daemon ensures that the exported vdisk is mapped to the server and, if it is not already, causes the server 110 to rescan the SCSI devices connected thereto to identify the newly mounted vdisk. Thus, a server may open a vdisk utilizing a file-based protocol and its associated namespace but perform later data access operations using a block-based protocol data path.

Thus, applications and clients 160/users of servers 110 served by the storage system 100 may utilize the namespace available from the file-based protocol, while benefiting from the high-speed data connection provided by an underlying transport media, such as Fibre Channel, connected to the vdisk. This enables an application executing on a server of the storage system to issue an Open command to access the vdisk using a conventional file-based protocol, such as the NFS protocol. The application may invoke the use of a transparent access process executing on the storage system by prepending a predetermined and special prefix to the filename in the Open command.

A NFS proxy layer 222 of a storage operating system 200 checks the filename sent in the filename field of the Open command. If the filename does not include the special prefix, then the storage operating system processes the request using the conventional file-based protocol. However, if the file name includes the predetermined and special prefix, then the NFS proxy layer 222 maps the vdisk associated with the file to be opened to the server that issued the Open command. A logical unit number (LUN) associated with this vdisk is also mapped to the server by the NFS proxy layer. The NFS proxy layer also, via a remote procedure call (RPC) or similar application-to-application communication method, communicates with a mount daemon 166 executing on the server.

The mount daemon 166 communicates to the storage system a set of major and minor device numbers to be associated with a newly created character device instance. A character device is a block-level interface that permits an arbitrary number of bytes to be written to a device. Typically, the number of bytes written is a multiple of the size of the data blocks on the storage device. Using the returned major/minor numbers, the NFS proxy layer generates a response to the Open command and returns that response to the server. The server, upon receiving the response, generates a new instance of a character device using the major/minor device numbers. The server then returns a file descriptor to the issuing application.

Thus, to the issuing application, and users thereof, the file has been opened using conventional NFS or other file-based protocol commands and its associated namespace. However, the NFS proxy layer, in conjunction with the mount daemon has generated a new character device on the server that enables the server to read and write raw data over the Fibre Channel or other block-based network infrastructure. Thus, a server experiences the ease of use of the file-based namespace, while benefiting from the performance of the block-based network infrastructure.

Further detail for a method and apparatus for allowing transparent access to vdisks using a file-based protocol is provided in the above-referenced U.S. Pat. No. 7,181,439, entitled SYSTEM AND METHOD FOR TRANSPARENTLY ACCESSING A VIRTUAL DISK USING A FILE-BASED PROTOCOL.

II. System for Deployment of VMs in a Virtual Server Environment

A. Virtual Server Environment

Figure 3:
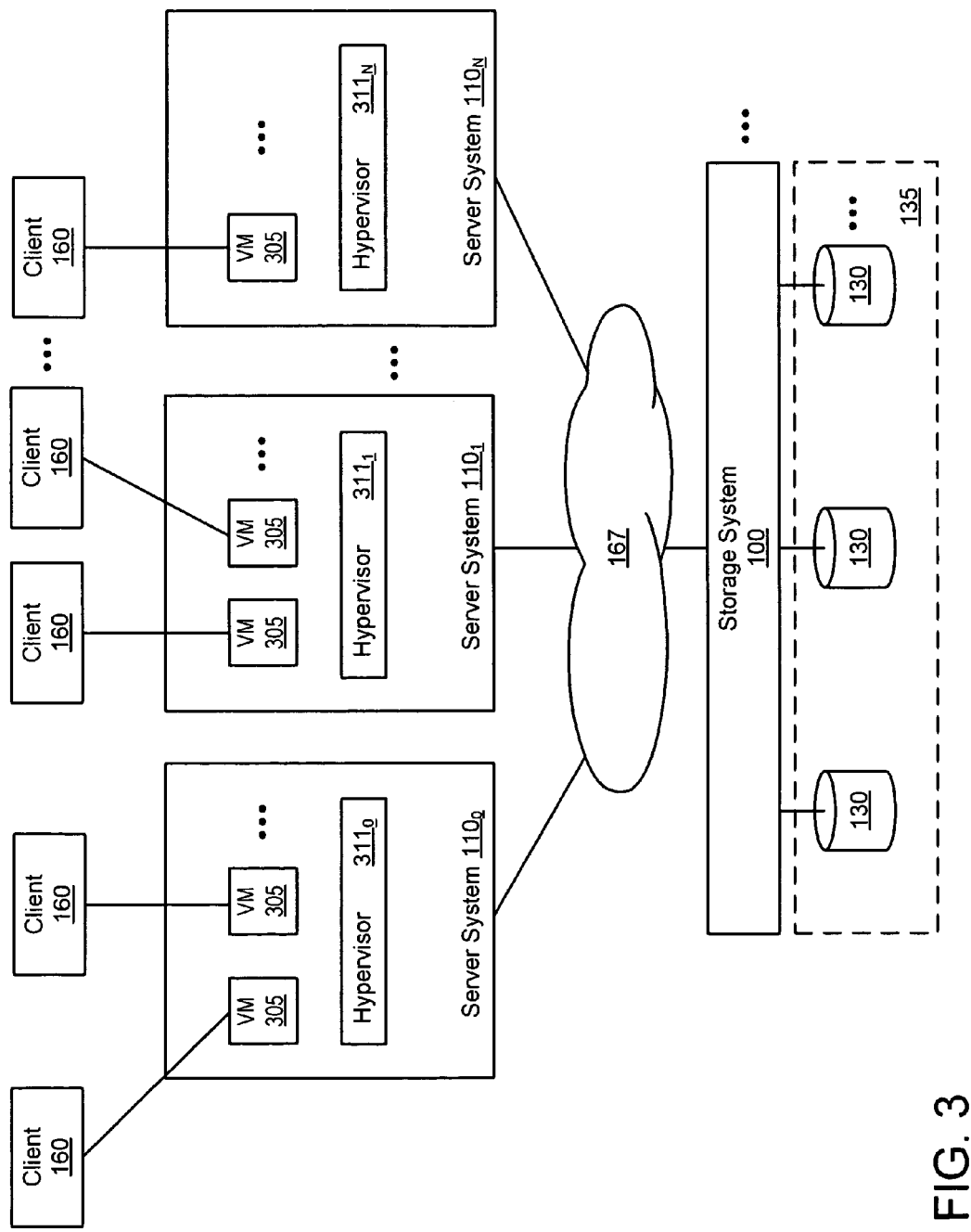
FIG. 3 shows a conceptual diagram of a virtual server environment comprising a plurality of clients and a plurality of physical servers accessing a storage system.

In some embodiments, the storage system 100 is used in a virtual server environment. FIG. 3 shows a conceptual diagram of a virtual server environment comprising a plurality of clients 160 and a plurality of physical servers $110_0$, $110_1$ ... $110_N$ accessing a storage system 100. The storage system 100 may comprise a set of storage devices 130 for storing client data, the storage devices 130 comprising a shared storage 135 of the storage system 100. Each server 110 may include one or more virtual machines 305 (VMs) that reside and execute on the server 110. Each VM 305 may comprise a separate encapsulation or instance of a separate operating system and one or more applications that execute on the server. As such, each VM 305 on a server 110 may have its own operating system and set of applications and function as a self-contained package on the server and multiple operating systems may execute simultaneously on the server.

Each VM 305 on a server 110 may be configured to share the hardware resources of the server. Each server may also include a VM monitor module/engine 311 (sometimes referred to as a hypervisor module/engine 311) that executes on the server to produce and manage the VMs. The VM monitor module/engine 311 (hypervisor 311) may also virtualize the hardware and/or software resources of the servers for use by the VMs 305. The operating system of each VM may utilize and communicate with the resources of the server via the VM monitor/hypervisor engine. For illustrative purposes, in the description below, the VM monitor module/engine comprises a hypervisor module/engine 311 (e.g., $311_0$, $311_1$, $311_2$). In other embodiments, however, a different type of VM monitor module/engine may be used other than the hypervisor module/engine.

The virtual server environment may also include a plurality of clients 160 connected with each server 110 for accessing client data stored on the storage system 100. Each client 160 may connect and interface/interact with a particular VM 305 of a server 110 to access client data of the storage system. From the viewpoint of a client 160, the VM 305 may comprise a virtual server that appears and behaves as an actual physical server or behaves as an actual desktop machine.

A storage system 100 may be configured to allow servers 110 to access its data, for example, to read or write data to the storage system. A server 110 may execute an application that "connects" to the storage system over a computer network 167 to send an access request (read or write request) to the storage system for accessing particular data stored on the storage system. Each server 110 may also include multiple VMs, each VM 305 being used by and connected with a client 160 through a computer network. Each VM 305 may also execute an application for sending read/write requests (received from the connected client 160) for accessing data on the storage system. The VM applications executing on the server may service the connected clients 160 by receiving the client access requests and submitting the access requests to the storage system 100 for execution.

B. Server Components

Figure 4:
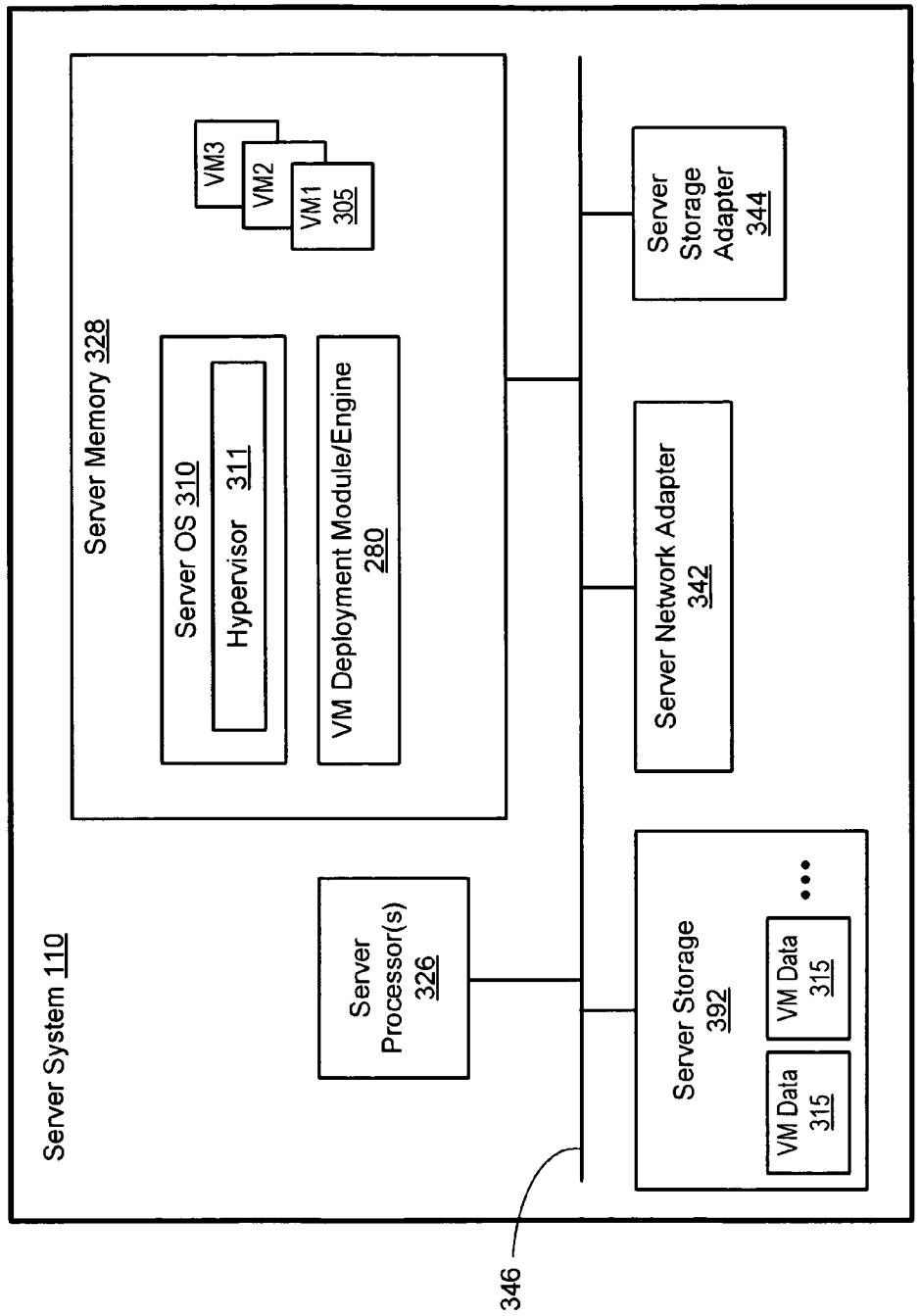
FIG. 4 is a diagram illustrating components of a server system within a virtual server environment.

FIG. 4 is a diagram illustrating components of a server system 110 within a virtual server environment. As shown in FIG. 3, a server system 110 may comprise one or more server processor(s) 326, server memory 328, one or more server network adapters 342, one or more server storage adapters 344, server storage 392, and other devices or peripherals (not shown) coupled to the processor by a bus 346.

The server processors are the central processing units (CPUs) of the server system 110 and, thus, control the overall operation of the server system 110. Server processors may include one or more programmable general-purpose or special-purpose microprocessors, digital signal processors (DSPs), programmable controllers, application specific integrated circuits (ASICs), programmable logic devices (PLDs), or the like, or a combination of such devices.

A server network adapter 342 may comprise mechanical, electrical, and signaling circuitry needed to connect the server system 110 to the network and to receive and transmit data over the network. The server network adapter 342 may comprise a network port controller (e.g., Ethernet cards), specialized network adapters, or any other physical device that controls the receiving and transmitting of data over a network. A server network adapter 342 may provide one or more network ports (i.e., data-access ports) for coupling the server system 110 to one or more other client systems 160 through a network 165. A connection with a client system 160 may be established using a network port of the server network adapter 342 to receive and transmit data though the network 165.

Server memory 328 comprises storage locations that are addressable by the processor and adapters (e.g., a server network), as well as other devices for storing software program code such as the software described herein. The server processor and server adapters may, in turn, comprise processing elements and/or logic circuitry configured to execute the software code. Server memory 328 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

Server memory 328 is for storing software program instructions and data structures such as a server operating system 310 (having a hypervisor module 311), a VM deployment module/engine 280, and one or more virtual machines 305 (as described above). A server system 110 loads information, instructions, par, and data structures into server memory 328 from which they are accessed and executed or processed by server processors 326 via a bus 346.

The server operating system 310 and hypervisor 311 may be, for example, VMware™ ESX, Microsoft™ Hyper-V, Microsoft™ Virtual Server, NetApp SnapShot™, NetApp SnapMirror™, Citrix XenServer™, UNIX®, Windows NT®, Linux®, or any other operating system and hypervisor capable of producing and configuring one or more virtual machines. The server operating system 310 may further include components discussed above in relation to FIG. 1B, such as mount daemon 166, Fibre Channel (FC) driver 168, TCP/IP 162, Network File System (NFS) layer 164 (not shown).

Server storage 392 may comprise a local writable storage device, such as disk devices, video tape, optical devices, DVD, magnetic tape, flash memory, Magnetic Random Access Memory (MRAM), Phase Change RAM (PRAM), or any other similar media adapted to store information (including data and parity information). As shown in the example of FIG. 4, server storage 392 may store VM data 315.

A VM 305 may be represented by data that describes the VM (referred to herein as "VM data" 315). In the example shown in FIG. 4, the server storage 392 may store VM data 315 for one or more VMs 305. In other embodiments, however, the VM data 315 may be stored elsewhere (e.g., on the storage system). In some embodiments, VM data 315 that represents a particular VM comprises a set of one or more VM files that describe the VM. VM data 315 may be stored and used later for producing and deploying the VM 305 represented by the VM data 315 on a server 110. VM data for multiple VMs needs to be stored efficiently with minimal use of valuable storage resources. Also, the VM data should be stored in way that allows for fast deployment of the VMs on a server when needed.

C. VM Deployment Module/Engine

In some embodiments, the VM deployment module/engine 280 (residing and executing on the server operating system 310 of a server 110) allows for efficient storing of VM data 315 and fast deployment of VMs 305 onto servers 110. In some embodiments, the VM deployment module/engine 280 may use some components of the transparent access technique (described above) along with additional components (described below) to store VM data 315 and deploy VMs 305 onto servers 110. In some embodiments, the VM deployment module/engine 280 may comprise a software module or engine that resides and executes outside the server 110 (e.g., resides and executes on the storage system 100 or a client system 160).

The VM deployment module/engine 280 may be configured to operate in conjunction with other components of the server system 110 (e.g., server operating system 310, hypervisor 311, mount daemon 166, Fibre Channel (FC) driver 168, TCP/IP 162, Network File System (NFS) layer 164, etc.) and components of the storage system 100 (e.g., storage system operating system 200, NFS proxy layer 222, vdisk module 270, SCSI target module 260, etc.) to collectively perform the embodiments described herein. The VM deployment module/engine 280 may produce, manipulate, modify, and/or destroy/remove storage objects (e.g. files, vdisks/LUs, etc.) on the storage system 100 and map/unmap storage objects onto various servers 100 to perform embodiments herein. In some embodiments, the VM deployment module/engine 280 may comprise PowerShell™ cmdlets used in a Windows PowerShell™ environment. The Windows PowerShell™ command interface runtime may invoke these cmdlets within the context of automation scripts that are provided at the command-line, as well as invoking them programmatically through Windows PowerShell™ APIs.

In some embodiments, the VM deployment module/engine 280 performs a "staging technique" to produce VM container objects representing VMs. A VM container object representing a particular VM may comprise VM data describing the VM and vdisk configuration data (discussed below). In these embodiments, after receiving an administrative command initiating the staging technique for one or more particular VMs, the VM deployment module/engine 280 produces a VM container object(s) representing the VM(s). After receiving the initiating administrative command specifying a particular VM, the VM deployment module/engine 280 may do so automatically, without further human initiation, interaction, or intervention.

In some embodiments, the VM deployment module/engine 280 also performs a "deployment technique" to deploy/produce VMs on a server 110 using the VM container objects produced in the staging technique (discussed below). In these embodiments, after receiving an administrative command initiating the deployment technique for one or more particular VMs, the VM deployment module/engine 280 produces a VM(s) using the VM container object(s) representing the VM(s). After receiving the initiating administrative command specifying a particular VM, the VM deployment module/engine 280 may do so automatically, without further human initiation, interaction, or intervention.

III. Staging Technique for Producing VM Container Objects

In some embodiments, the VM deployment module/engine 280 performs a "staging technique" to produce VM container objects representing VMs. A VM container object representing a particular VM may comprise VM data describing the VM and vdisk configuration data (discussed below). FIG. 6 is a flowchart of a staging method for producing VM container objects, in accordance with some embodiments. The method 600 of FIG. 6 is described in relation to FIGS. 5A-5E which conceptually illustrate steps of the staging method 600. In some embodiments, after initiation of the method 600 for a particular VM (e.g., by receiving an administrative command), the method 600 may produce a VM container object representing the VM automatically, without further human initiation, interaction, or intervention. The order and number of steps of the method 600 are for illustrative purposes only and, in other embodiments, a different order and/or number of steps are used. For illustrative purposes, the container object is described below as a container file having a filename. In other embodiments, however, the container object may comprise another type of storage container.

In some embodiments, some of the steps of the method 600 are performed or caused to be performed by a VM deployment module/engine 280 executing on a server 110. The VM deployment module/engine 280 may perform the staging technique by sending requests/commands to various components of the server operating system 310 of the server system 110 (e.g., hypervisor 311, mount daemon 166, Fibre Channel (FC) driver 168, TCP/IP 162, Network File System (NFS) layer 164, etc.) and various components of the storage system operating system 200 of the storage system 100 (e.g., NFS proxy layer 222, vdisk module 270, SCSI target module 260, etc.) to perform specified operations. The various components of the server operating system 310 and storage system operating system 200 may receive and execute/perform such commands to collectively perform the staging technique of method 600.

Figure 5A:
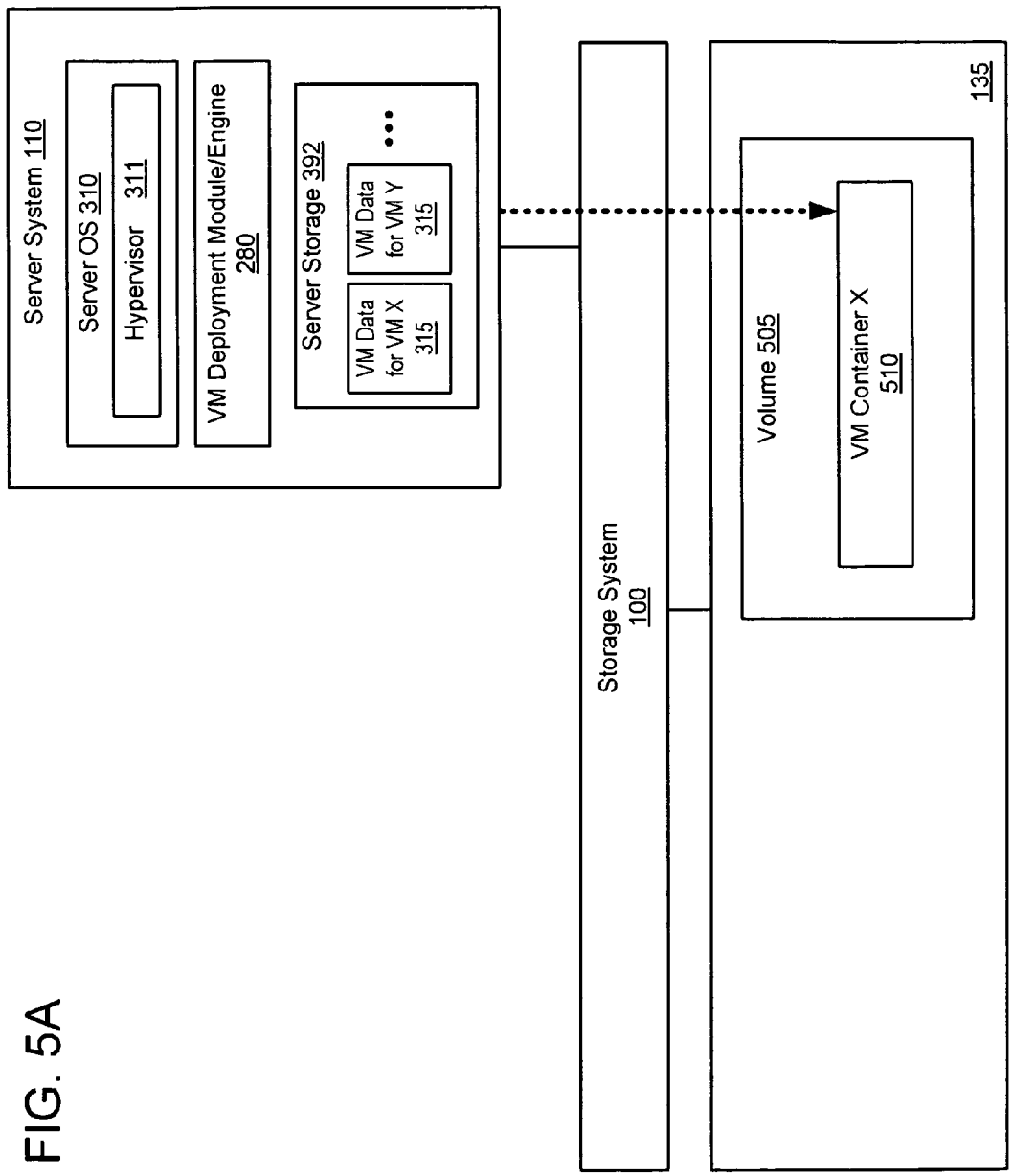
FIGS. 5A-5E conceptually illustrate steps of a staging method.
Figure 5B:
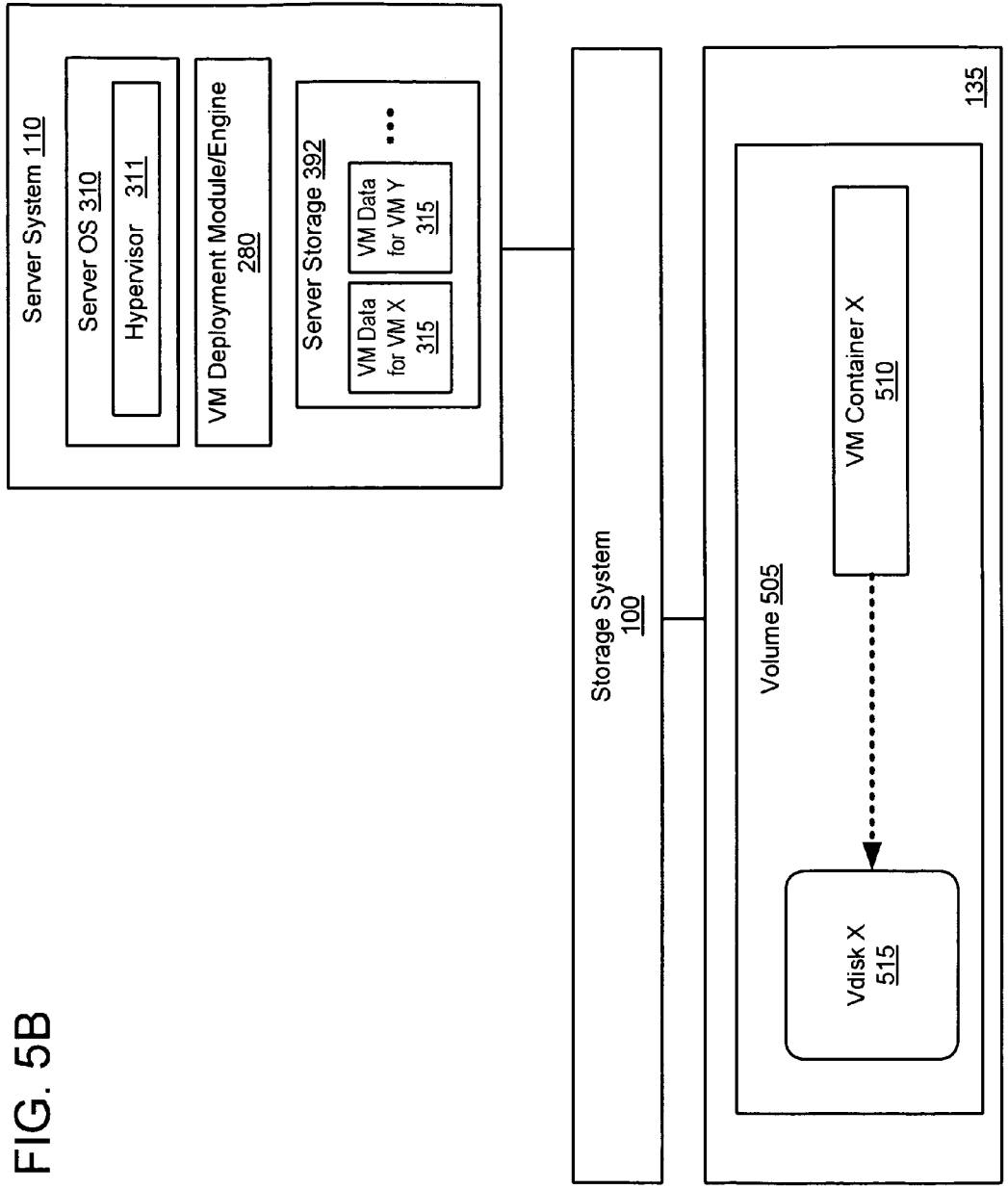
Figure 6:
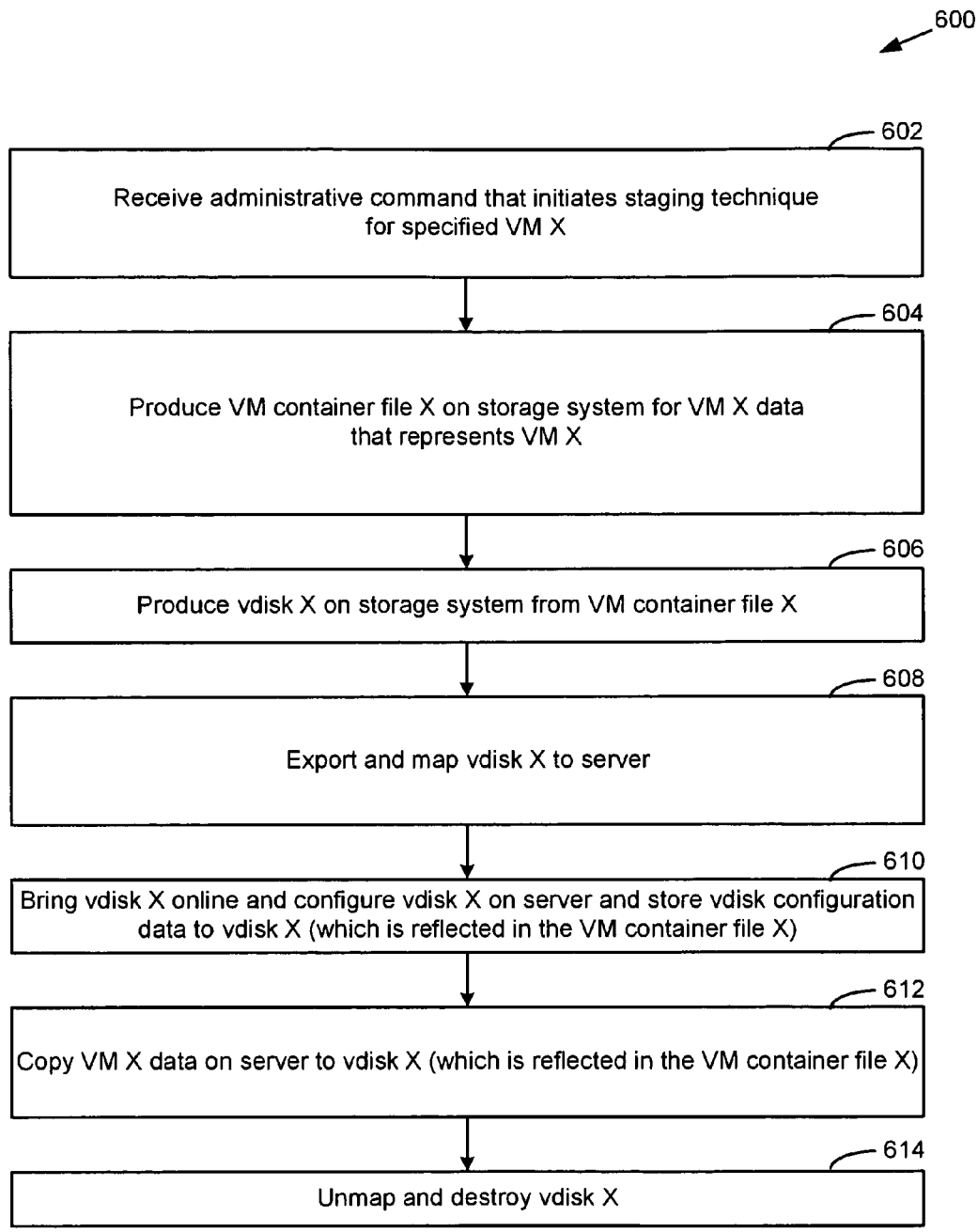
FIG. 6 is a flowchart of a staging method for producing VM container objects, in accordance with some embodiments.

FIG. 5A shows a conceptual diagram of a virtual server environment upon initiation of the staging technique. As shown in FIG. 5A, a server 100 stores VM data 315 for one or more VMs (shown as "VM data for VM X," "VM data for VM Y," etc.) on local server storage 392. The VM data for a VM may be produced by a hypervisor engine 311 executing on the server 100 which generates the VM data and stores to the local server storage 392. In other embodiments, however, the VM data 315 may be stored elsewhere (e.g., on the storage system).

VM data 315 may represent and describe a VM 305. In some embodiments, VM data 315 for a VM specifies hardware and/or software resources on a server and/or storage system that the VM uses during operation. As such, a VM may be viewed as being composed of the specified hardware and/or software resources. The VM data 315 for a VM may comprise a set of one or more VM files that describes hardware and/or software resources used by the VM. For example, the set of VM files may comprise a VM configuration file specifying various components that the VM uses, such as an operating system, network adaptor, IP address, hard disks, etc. The set of VM files may also comprise one or more virtual hard disk (VHD) files specifying virtual hard disks that the VM uses (e.g., C, E, F drives).

As shown in FIG. 6, the method 600 begins upon receiving (at 602) at the server an administrative command that initiates the staging technique for a particular VM. The administrative command may specify that a VM container file be produced for a particular VM (e.g., "Produce VM container file for VM X"). In response, the method 600 then automatically performs the below steps to produce a VM container file for VM X, the VM container file storing the VM data and vdisk configuration data for the VM.

The method 600 produces (at 604) an empty VM container file 510 for VM data (referred to herein as "VM X data") that represents VM X on a volume 505 of the shared storage 135 of the storage system 100. The method 600 may do so by examining the VM X data 315 and producing an empty VM container file 510 (named VM container file X) that has enough storage space to hold all VM X data along with extra storage space to store vdisk configuration data for VM X (discussed below). The extra storage space may comprise a predetermined amount of storage space. For example, the produced VM container file may have enough storage space to hold all the VM data plus an additional 10% more storage space to store the vdisk configuration data. The method 600 may produce (at 604) the empty VM container file 510 on the storage system 100 by sending a "new container" command/request from the server 110 to the storage system 100, the command specifying the container filename (X) and size. Upon receiving the "new container" command, the storage operating system 200 of the storage system 100 performs the command to produce empty VM container file X on a volume 505 of the storage system 100 (which is conceptually shown in FIG. 5A by the dashed arrow line).

The method 600 then produces (at 606) a vdisk/LU 515 (vdisk X) from the VM container file X on the volume 505 of the storage system 100. The method 600 may do so by sending a "new vdisk from container" command/request from the server 110 to the storage system 100, the command specifying the vdisk name (X) and container filename X. Upon receiving the "new vdisk from container" command, the storage operating system 200 of the storage system 100 performs the command to produce the vdisk 515 (vdisk X) on the storage system 100 (which is conceptually shown in FIG. 5B by the dashed arrow line).

The command may be accomplished using conventional storage operating system procedures for converting a file into a vdisk. One example of such a procedure is described in U.S. Pat. No. 7,383,378, issued Jun. 3, 2008, entitled SYSTEM AND METHOD FOR SUPPORTING FILE AND BLOCK ACCESS TO STORAGE OBJECT ON A STORAGE APPLIANCE by Vijayan Rajan et al., the contents of which are hereby incorporated by reference. As known in the art, when producing a vdisk, the vdisk may be block aligned by the storage system by assigning a vdisk type to vdisk based on the server operating system it will be exported to. Upon exporting the properly aligned vdisk to the server, the vdisk is partitioned and formatted by the server. Aligning a vdisk to a block boundary (e.g., 32 KB boundary offset) of the server operating system may provide better vdisk performance during later reads/writes. Also note that the storage space of vdisk X will be as large as the storage space for container file X, thus ensuring that vdisk X can hold the VM data for VM X and still have additional storage space for the vdisk configuration data.

At step 608, the method 600 exports the vdisk X 515 from the storage system to the server and maps the vdisk to the server. The method 600 may do so by sending an "export vdisk" command/request from the server 110 to the storage system, the command specifying the vdisk name (X). Upon receiving the "export vdisk" command, the storage operating system 200 of the storage system 100 exports vdisk X to the server 110 (which is conceptually shown in FIG. 5C by the dashed arrow line) to make vdisk X 515 visible to the server 110. Upon receiving exported vdisk X, the server operating system 310 of the server 110 maps vdisk X 515 using conventional vdisk masking/mapping techniques. For example, the server operating system 310 may rescan the SCSI devices associated with the server 110 to locate the newly mapped vdisk and create a major/minor device number to be associated with the vdisk to uniquely identify the instantiation of a raw character device to be associated with the vdisk. Mapping of the vdisk 515 may ensure that the server 110 has identified the vdisk associated with the file and may begin configuring the vdisk.

Figure 5C:
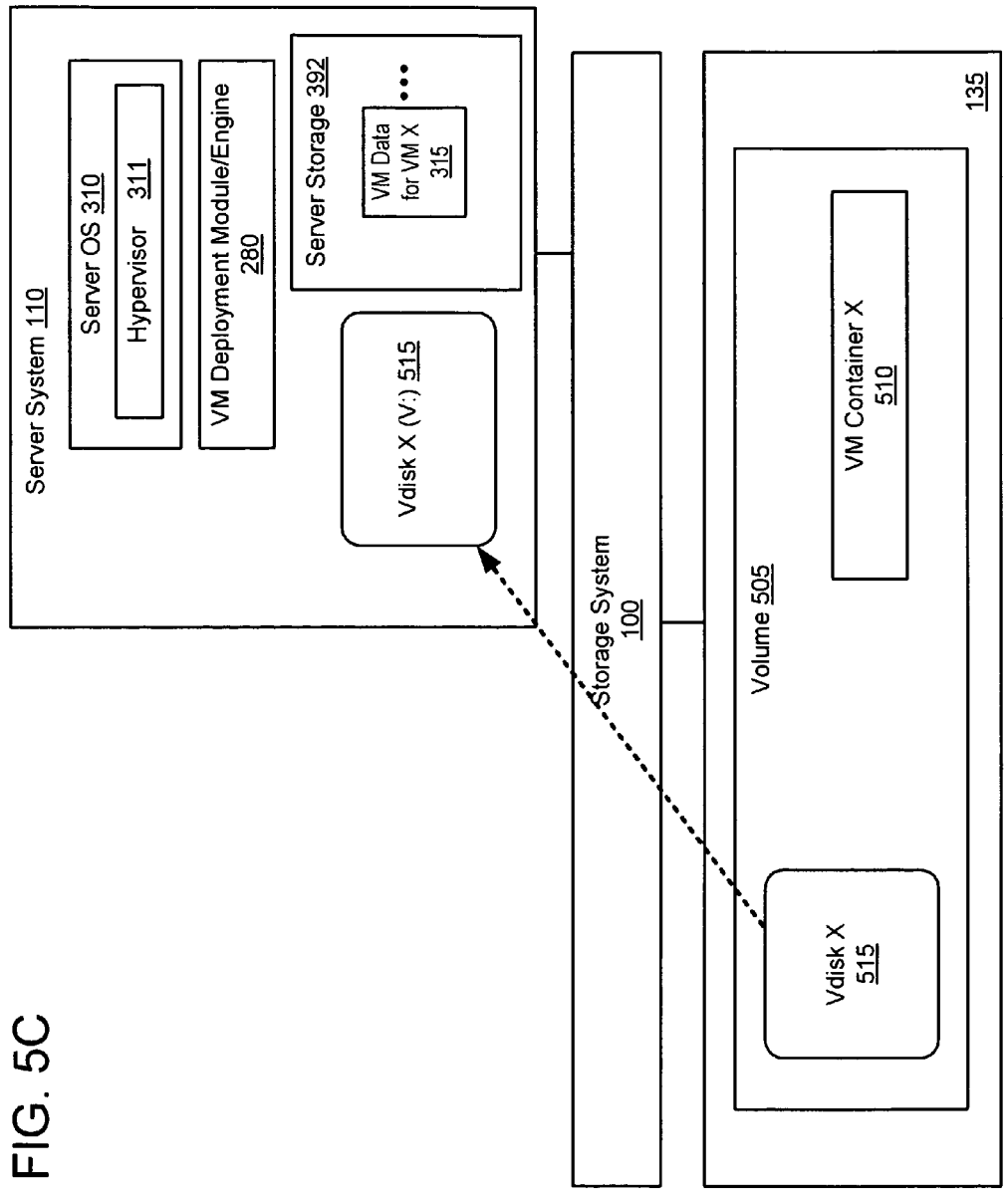

At step 610, the method 600 then brings the vdisk X 515 online on the server, configures the vdisk X 515 on the server 110, and stores vdisk configuration data on the vdisk X 515 (which is reflected in the VM container file X 510). As used herein, "configuring" a vdisk may comprise the operations of partitioning and/or formatting the vdisk. "Configuring" a vdisk may comprise any or all of these operations. The method 600 may do so by sending "partition" and/or "format" commands to the server operation system 310, the command(s) specifying the vdisk name (X). Upon receiving the command(s), the server operating system 310 performs the commands using conventional vdisk partitioning and formatting techniques. Configuring of the vdisk may be performed to make the vdisk useable by the server operating system 310 (i.e., so data and files may be stored to and read from the vdisk). Prior to configuring of the vdisk, the server operating system 310 may be unable to access data or files from the vdisk. After vdisk X 515 is configured, it is now visible and useable by the server operating system which assigns a drive name to the vdisk X (e.g., drive V as shown in FIG. 5C).

As known in the art, formatting a vdisk comprises low-level formatting to divide the vdisk into basic elements (e.g., tracks, sectors, cylinders) and high level formatting (logical formatting) to create a file system on the vdisk that will allow the server operating system to use the vdisk space to store and access files. As known in the art, partitioning a vdisk comprises creating areas on the vdisk where data will not be mixed (used, for example, to install different operating systems that do not use the same file system). Partitioning may also include other operations such as creating a master boot record (MBR) partition.

The end result of each of the configuring operations (partitioning and formatting) on the vdisk may be described/specified by data that describes the result of each operation (referred to herein as "vdisk configuration data" 525). After configuring the vdisk X 515, the server operating system 310 may store the vdisk X configuration data 525 on the vdisk X 515 (drive V:), which is conceptually shown in FIG. 5D by the dashed arrow line. Note that any data contents in the vdisk X 515 is typically copied to the corresponding VM container file X 510 by the storage operating system 200, so the VM container file X 510 will also contain the vdisk configuration data 525 (which is conceptually shown in FIG. 5D by the dashed arrow line).

In other embodiments, the data contents in the vdisk X 515 may not be directly copied to the corresponding VM container file X 510, but rather the vdisk 515 and the corresponding VM container file X may be configured by the storage operating system 200 to have meta-data pointers that point to the same data, thereby allowing both to access the same data. As such, any data stored in the vdisk X 515 may be reflected in the corresponding VM container file X (which is conceptually shown in FIG. 5D by the dashed arrow line) and made accessible through the corresponding VM container file X (i.e., the container file used to produce the vdisk X). In general then, the vdisk X 515 and corresponding VM container file X may each be considered as containing/storing the vdisk configuration data 525, since accessing either the vdisk X or the VM container file X will allow access to the vdisk configuration data 525.

For example, the vdisk configuration data 525 may comprise formatting data that describes/specifies the division of the vdisk into basic elements (low-level formatting) and describes/specifies the file system formatting for the file system that was created on the vdisk (logical formatting). The vdisk configuration data 525 may further comprise partitioning data that describes/specifies the areas created on the vdisk where data will not be mixed and/or master boot record (MBR) partition data. As a further example, vdisk configuration data 525 may also comprise drive signature data, whereby a server operating system may generate a Globally Unique IDentifier (GUID) to represent the disk and write the GUID to the disk as part of its configuration data for the disk, the GUID comprising the drive signature.

Note that the server operating system 310 will configure the vdisk according to its own partitioning and formatting procedures and requirements/parameters so that the vdisk is useable by the server operating system 310 (so data and files may be stored to and read from the vdisk by the server operating system 310). As such, different server operating systems may configure a vdisk differently according to its own partitioning and formatting procedures and parameters. Thus, a vdisk configured by one server operating system (using a first set of configuration procedures and parameters) may be unuseable by a second different server operating system (using a second different set of configuration procedures and parameters). As such, the vdisk configuration data 525 may also be based on the partitioning and formatting procedures and parameters of the specific server operating system that configures the vdisk. Thus, the vdisk configuration data 525 produced by the different server operating systems may also be different.

Figure 5D:
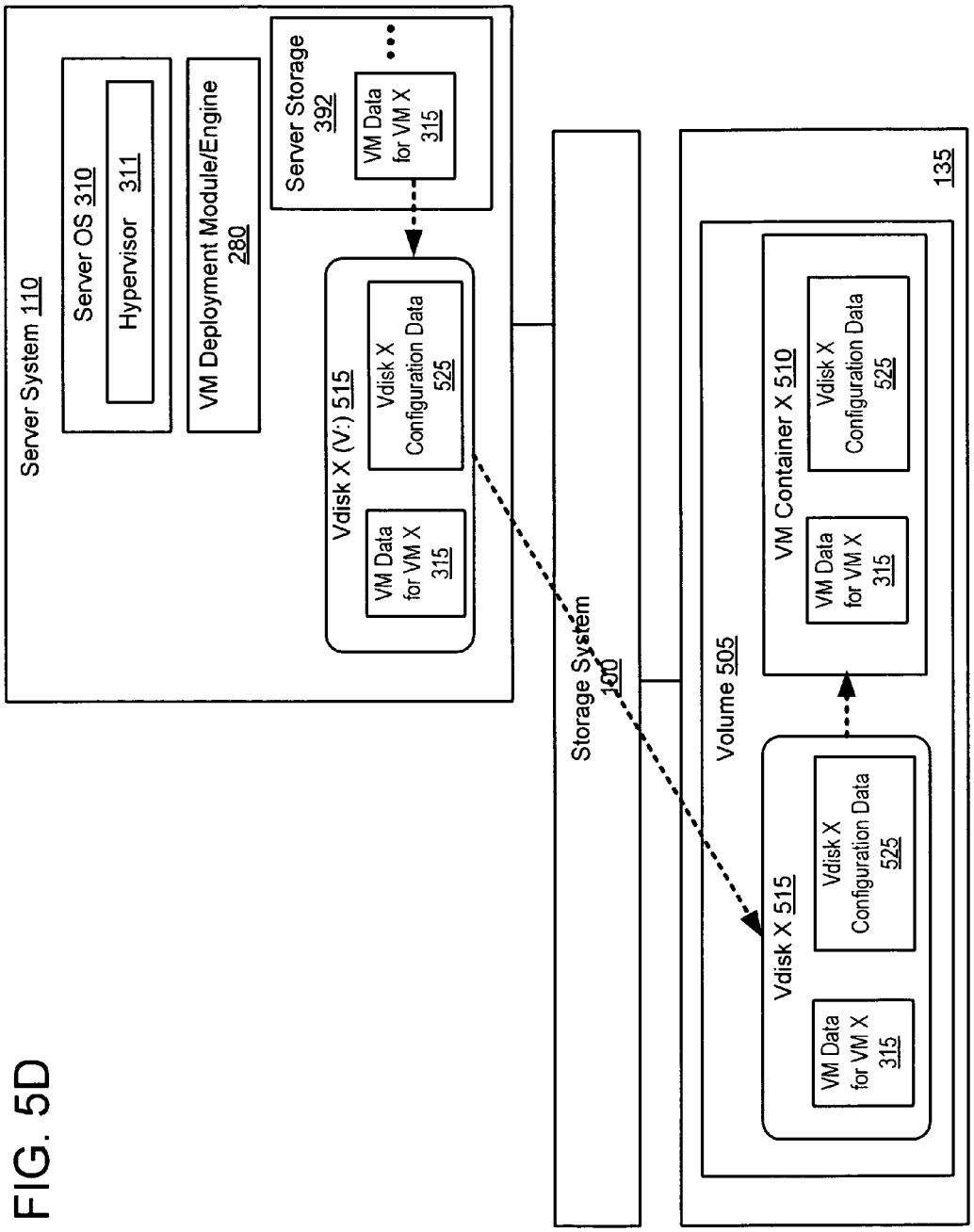

At step 612, the method 600 then copies the VM data for VM X ("VM X data") stored on the server 110 to the vdisk X 515 (which is reflected in the corresponding VM container file X 510) on the storage system 100 (which are conceptually shown in FIG. 5D by the dashed arrow lines). The method 600 may copy VM X data to the vdisk X 515 by sending a copy command to the server operation system 310, the command specifying the drive name (V:) assigned to vdisk X 515 and VM X data to be copied to the drive. Upon receiving the command, the server operating system 310 copies VM X data to vdisk X 515. As discussed above, data contents in the vdisk X 515 is typically reflected in the corresponding VM container file X (which is conceptually shown in FIG. 5D by the dashed arrow line) and made accessible through the corresponding VM container file X as well. As such, the corresponding VM container file X 510 will also contain the VM X data 315 (as shown in FIG. 5D).

Figure 5E:
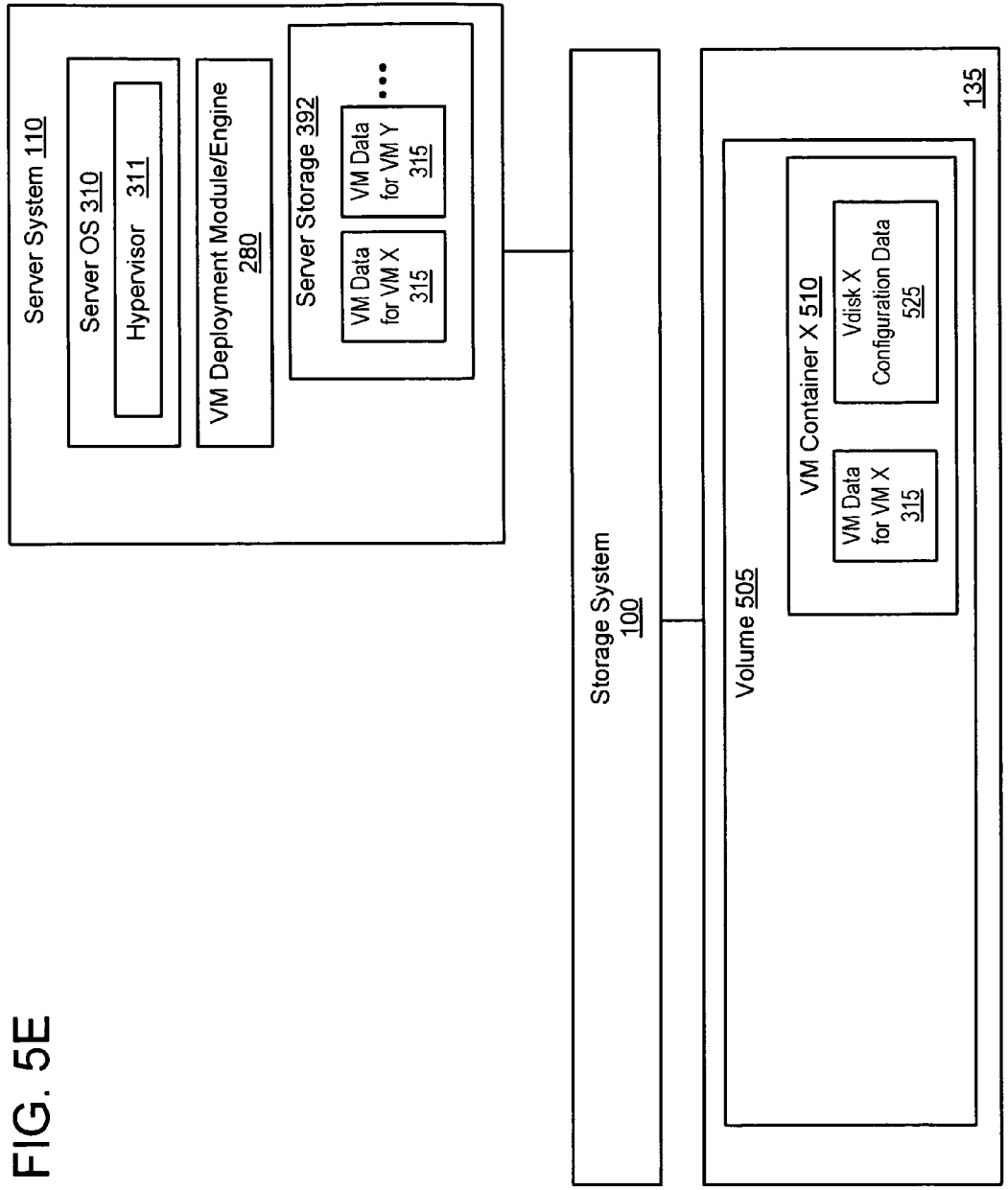

At step 614, the method 600 then unmaps and destroys the vdisk X 515 on the storage system 100 (which is conceptually shown in FIG. 5E by the now absent vdisk 515). The method 600 may do so by sending an "remove vdisk map and remove vdisk" command to the storage operating system 200, the command specifying the vdisk to be destroyed. As known in the art, a vdisk may comprise a logical unit (LU) having an associated logical unit number (vdisk) that uniquely identifies the vdisk/LU within a volume of the storage system. However, typically there is a limited number of vdisks/LUs that can exist in the volume at the same time. As such, by destroying the vdisk, the number of allowed vdisks on the volume are not used up by staging technique and valuable storage resources are not consumed unnecessarily on the storage system 100. The method 600 then ends.

As shown in FIG. 5E, however, the VM container file X 510 does not get destroyed and remains in the shared storage 135. Note that the VM container file X 510 contains the VM data for VM X and the vdisk X configuration data 525 (or contains meta-data pointers to such data). As such, all the data needed to later quickly deploy the VM X is accessible through the VM container file X 510. This is because, at the deployment stage, a vdisk (representing a VM) is later produced on the server using the VM container file and the vdisk configuration data 525 may be used to specify the configuration of the vdisk. This avoids having the server to configure the vdisk which allows for rapid deployment of the vdisk/VM.

Note that in the staging technique described above, a vdisk may be configured (partitioned, formatted, etc.) by the server operating system to produce vdisk configuration data 525. A file, however, can not typically be configured (partitioned, formatted, etc.) in the same manner as a vdisk by the server operating system and configuration data can not be produced using a file. As such, in some embodiments, a vdisk is configured and used to produce configuration data 525. As described above, however, there is typically a limited number of vdisks that can exist in the volume at the same time and use of vdisks to hold VM data for VMs may quickly use up the number of allowed vdisks. As such, in some embodiments, by destroying the vdisk and keeping only the VM container file (having the VM data 315 and the vdisk configuration data 525), the number of allowed vdisks are not consumed unnecessarily. In this manner, VM data 315 and vdisk configuration data 525 may be stored efficiently and be used later to provide rapid deployment of VMs.

IV. Deployment Technique for Producing VMs

In some embodiments, the VM deployment module/engine 280 performs a "deployment technique" to deploy/produce VMs on a server 110 using the VM container objects representing VMs (that were produced in the staging technique). FIG. 8 is a flowchart of a deployment method for deploying VMs using VM container files, in accordance with some embodiments. The method 800 of FIG. 8 is described in relation to FIGS. 7A-7E which conceptually illustrate steps of the deployment method 800. In some embodiments, after initiation of the method 800 for a particular VM (e.g., by receiving an administrative command), the method 800 may deploy/produce the specified VM automatically, without further human initiation, interaction, or intervention. The order and number of steps of the method 800 are for illustrative purposes only and, in other embodiments, a different order and/or number of steps are used. For illustrative purposes, the container object is described below as a container file having a filename. In other embodiments, however, the container object may comprise another type of storage container.

In some embodiments, some of the steps of the method 800 are performed or caused to be performed by a VM deployment module/engine 280 executing on a server 110. The VM deployment module/engine 280 may perform the deployment technique by sending requests/commands to various components of the server operating system 310 of the server system 110 (e.g., hypervisor 311, mount daemon 188, Fibre Channel (FC) driver 188, TCP/IP 182, Network File System (NFS) layer 184, etc.) and various components of the storage system operating system 200 of the storage system 100 (e.g., NFS proxy layer 222, vdisk module 270, SCSI target module 280, etc.) to perform specified operations. The various components of the server operating system 310 and storage system operating system 200 may receive and execute/perform such commands to collectively perform the deployment technique of method 800.

Figure 7A:
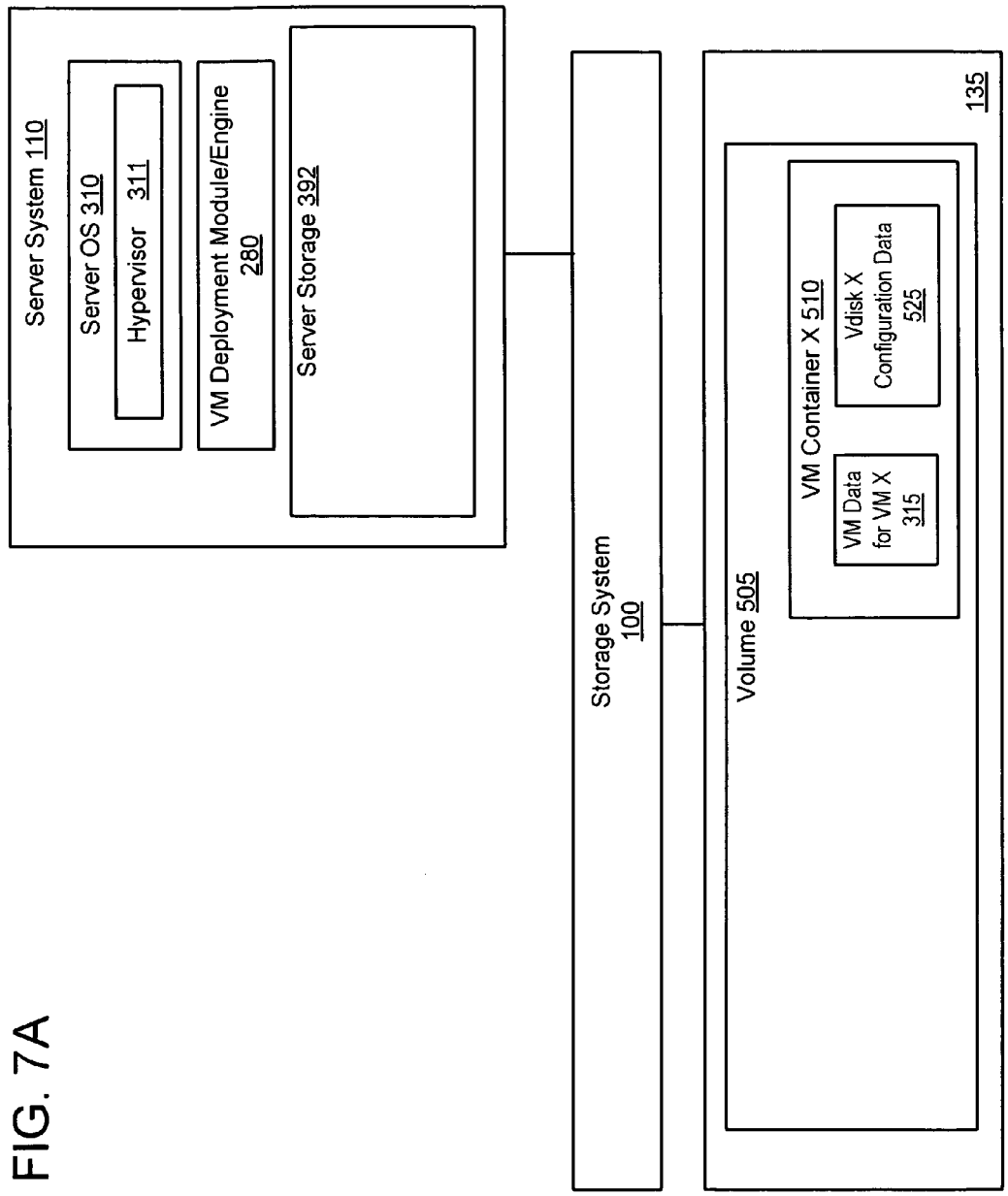
FIGS. 7A-7E conceptually illustrate steps of a deployment method.
Figure 7B:
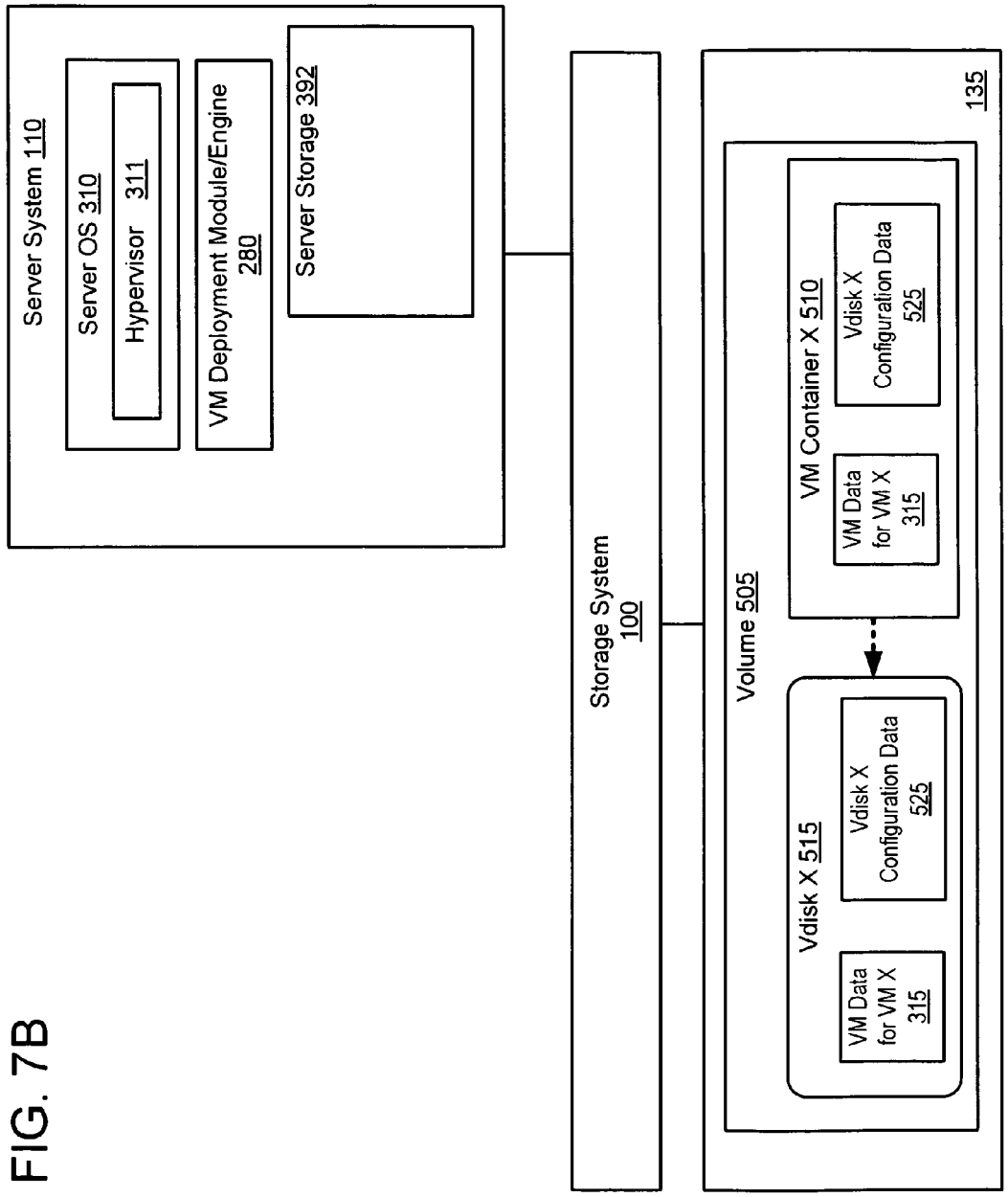
Figure 7C:
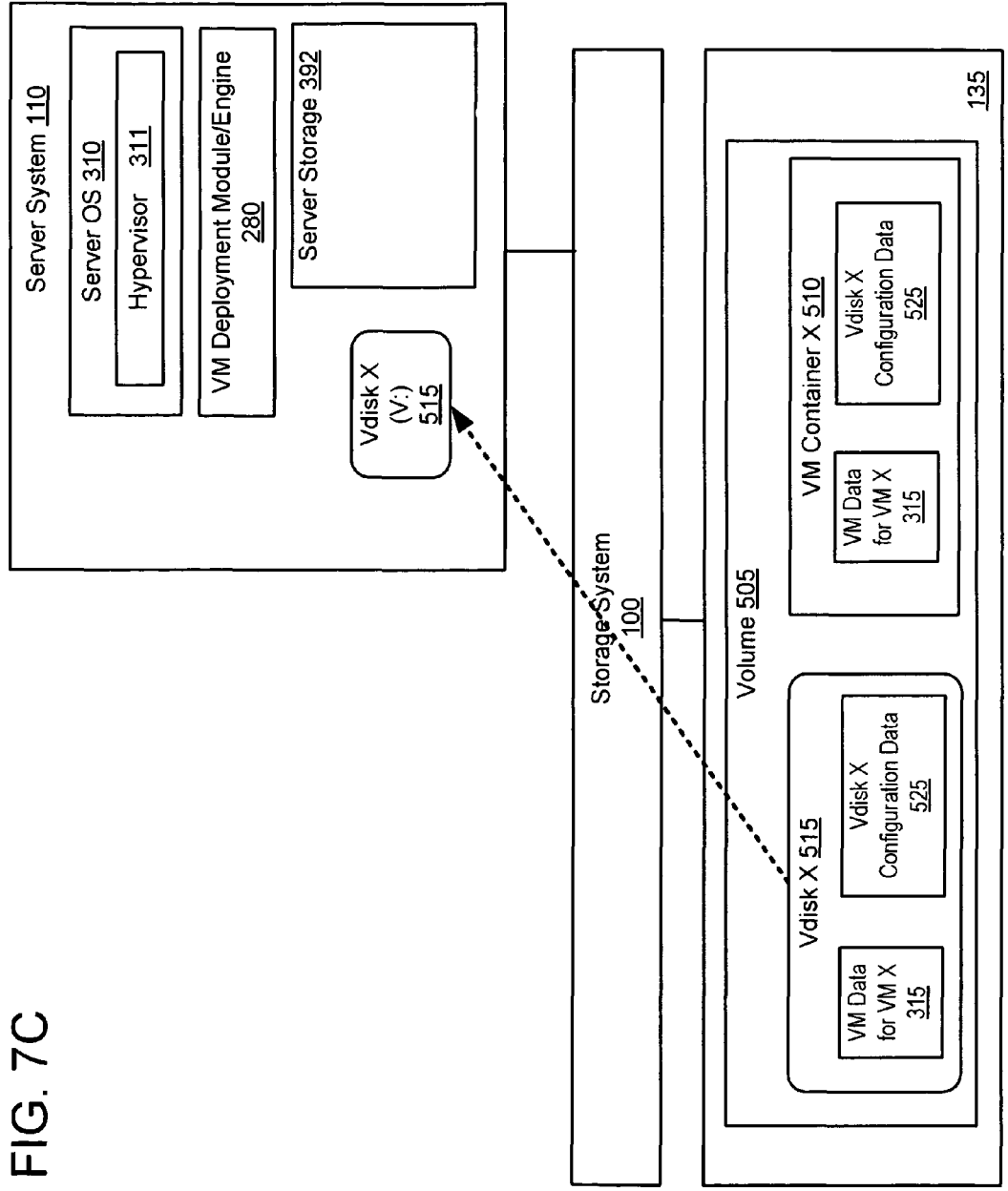
Figure 8:
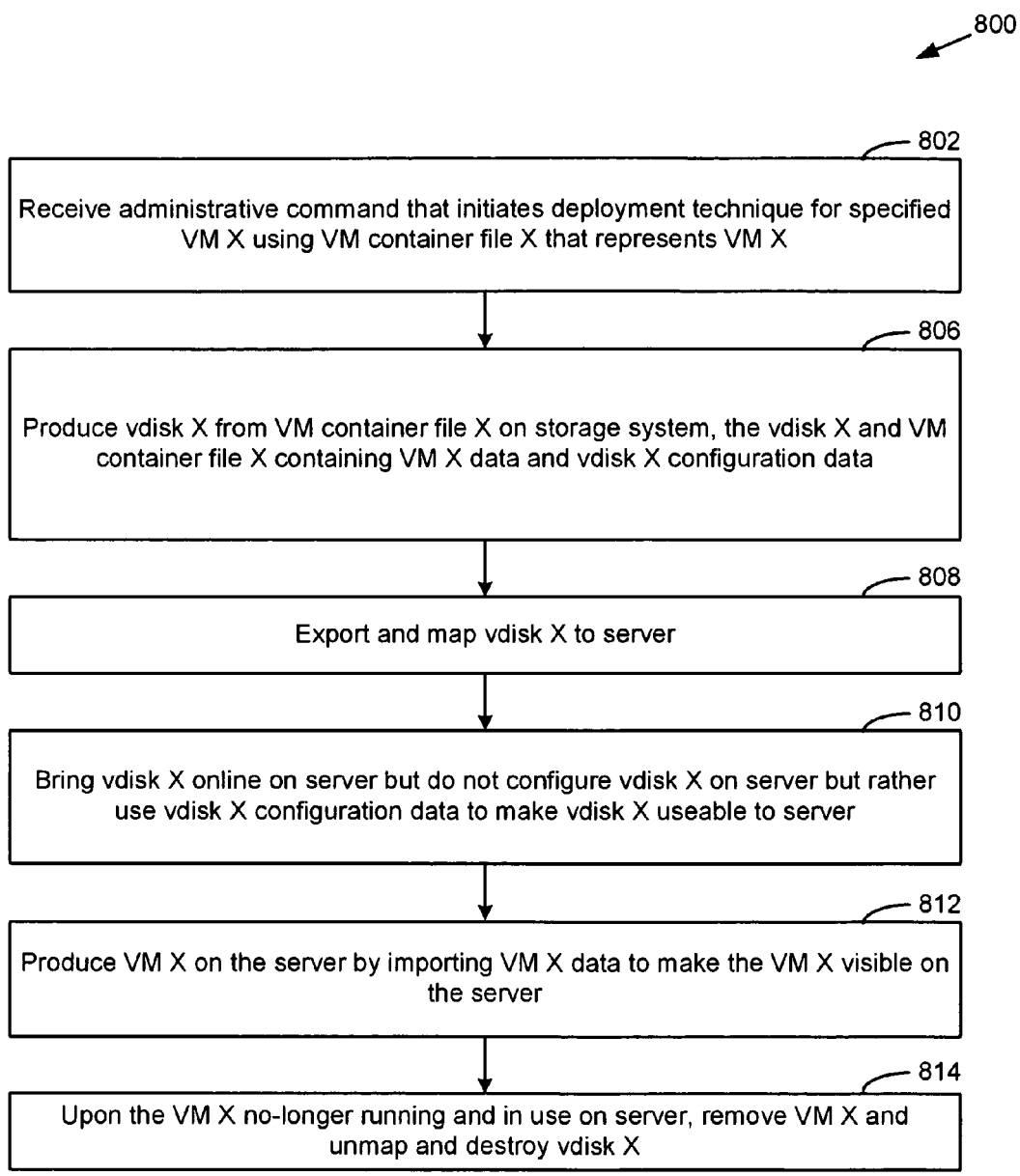
FIG. 8 is a flowchart of a deployment method for deploying VMs using VM container files, in accordance with some embodiments.

FIG. 7A shows a conceptual diagram of a virtual server environment before initiation of the deployment technique. As shown in FIG. 7A, a VM container file X 510 representing VM X is stored on the storage system 100. The VM container file X contains VM X data 315 (describing VM X) and vdisk X configuration data 525 (specifying the configuration of a vdisk that was previously configured by the server operating system 310 according to the specific configuration procedures and parameters of the server operating system 310). As such, any vdisk containing the vdisk X configuration data 525 would be immediately useable by the server operating system 310 for storing and reading data and files (such as the VM data) stored on the vdisk, without the server operating system 310 having to actually configure the vdisk to do so.

Note that the server 110 used in the deployment technique may be the same server 110 as used in the staging technique or may be a different server. If the servers 110 are different, as long as both servers are using the same type of server operating systems 310, the vdisk configuration data 525 would be compatible with both servers and a vdisk containing the vdisk configuration data 525 produced by one server operating system would be immediately useable by the other server operating system 310 for storing and reading data and files.

As shown in FIG. 8, the method 800 begins upon receiving (at 802) an administrative command that initiates the deployment technique for a particular VM. The administrative command may specify the VM to be deployed and the VM container file that represents the VM (e.g., "Deploy VM X using VM container file X"). In response, the method 800 then automatically performs the below steps to deploy the VM.

The method 800 produces (at 806) a vdisk 515 (vdisk X) from the VM container file X, the vdisk X being produced on a volume 505 of the storage system 100 and containing the VM X data 315 and vdisk X configuration data 525 stored in the VM container file X. The method 800 may do so by sending a "new vdisk from container" command/request from the server 110 to the storage system 100, the command specifying the vdisk name (X) and container filename X. Upon receiving the "new vdisk from container" command, the storage operating system 200 of the storage system 100 performs the command to produce the vdisk 515 (vdisk X) on the storage system 100 (which is conceptually shown in FIG. 7B by the dashed arrow line). The command may be accomplished using conventional storage operating system procedures for converting a file into a vdisk. In conventional procedures for converting a file into a vdisk, the contents of the file is typically copied/imported to the created vdisk as well. As such, the vdisk X 515 produced on the storage system 100 will contain the VM X data 315 and vdisk X configuration data 525 in the VM container file X.

The method 800 then exports and maps (at 808) the vdisk X 515 from the storage system to the server. The method 800 may do so by sending an "export vdisk" command/request from the server 110 to the storage system, the command specifying the vdisk name (X). Upon receiving the "export vdisk" command, the storage operating system 200 of the storage system 100 exports vdisk X to the server 110 (which is conceptually shown in FIG. 7C by the dashed arrow line) to make vdisk X 515 visible to the server 110. Upon receiving vdisk X, the server operating system 310 of the server 110 maps vdisk X 515 using conventional vdisk masking/mapping techniques.

The method 800 then brings the vdisk X 515 online (at 810) on the server 110. In some embodiments, configuring of the vdisk X 515 (partitioning and formatting the vdisk X 515) by the server operating system 310 is omitted. As described above, configuring of the vdisk by the server operating system 310 is typically done to make the vdisk useable by the server operating system 310 (i.e., so data and files may be stored to and read from the vdisk). Prior to configuring of the vdisk, the server operating system 310 may be unable to access data or files from the vdisk.

However, since the vdisk X already contains the vdisk X configuration data 525, the vdisk X is already, in effect, configured and useable by the server operating system 310. The vdisk X configuration data may be read by the server operating system to make the vdisk useable. For example, the vdisk X configuration data 525 will already specify and provide a file system for the vdisk X so the server operating system 310 may immediately use the file system to access files (e.g., VM files describing the VM to be deployed) in the vdisk X. Thus the vdisk X configuration data 525 may be used to make the vdisk X immediately useable by the server operating system 310 and may be used to forego the configuring (partitioning and formatting) of the vdisk X. As such, modules of the server operating system 310, such as the hypervisor 311, may immediately read data and files (such as the VM X data 315 comprising VM files) stored on the vdisk X.

Figure 7D:
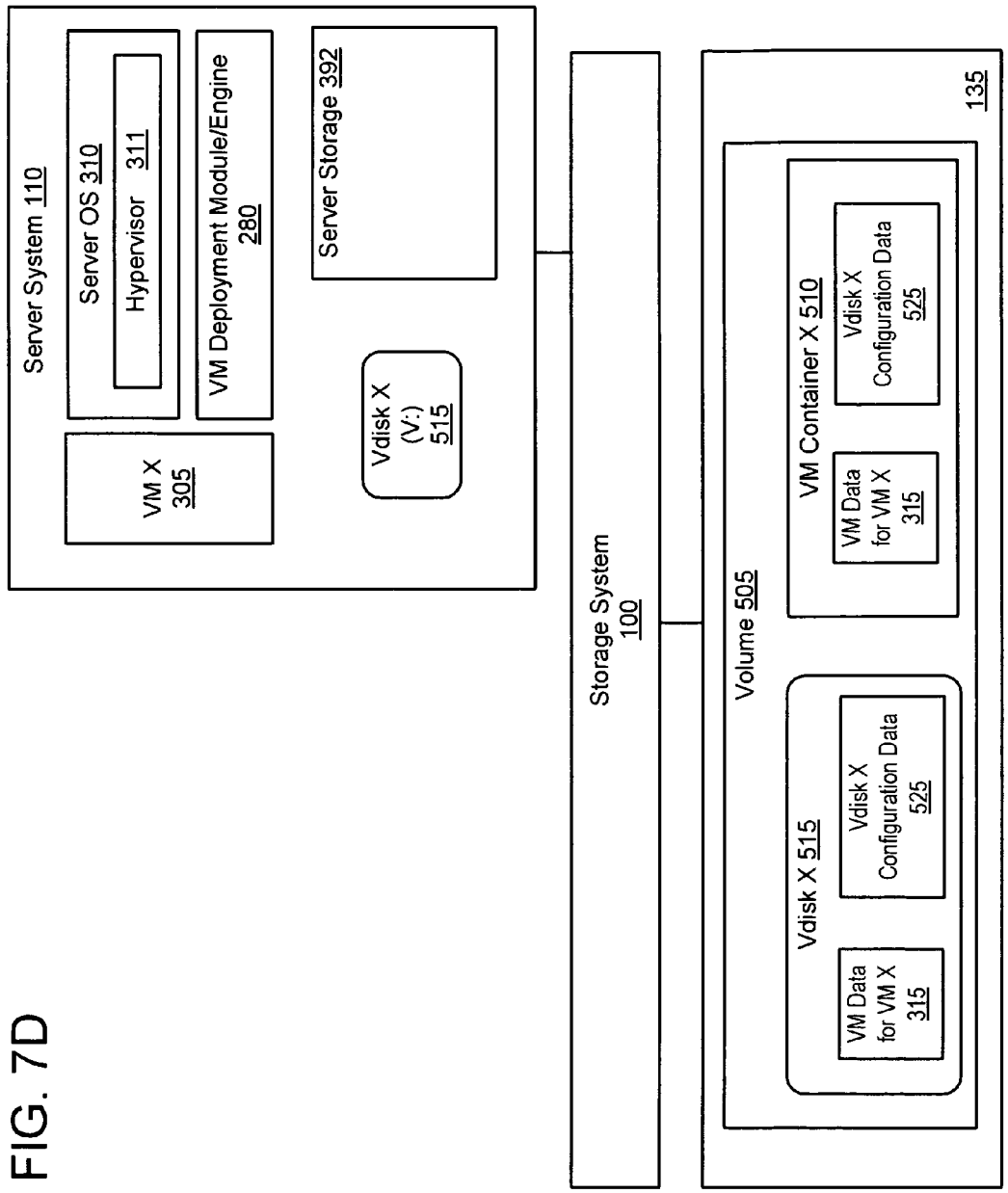
Figure 7E:
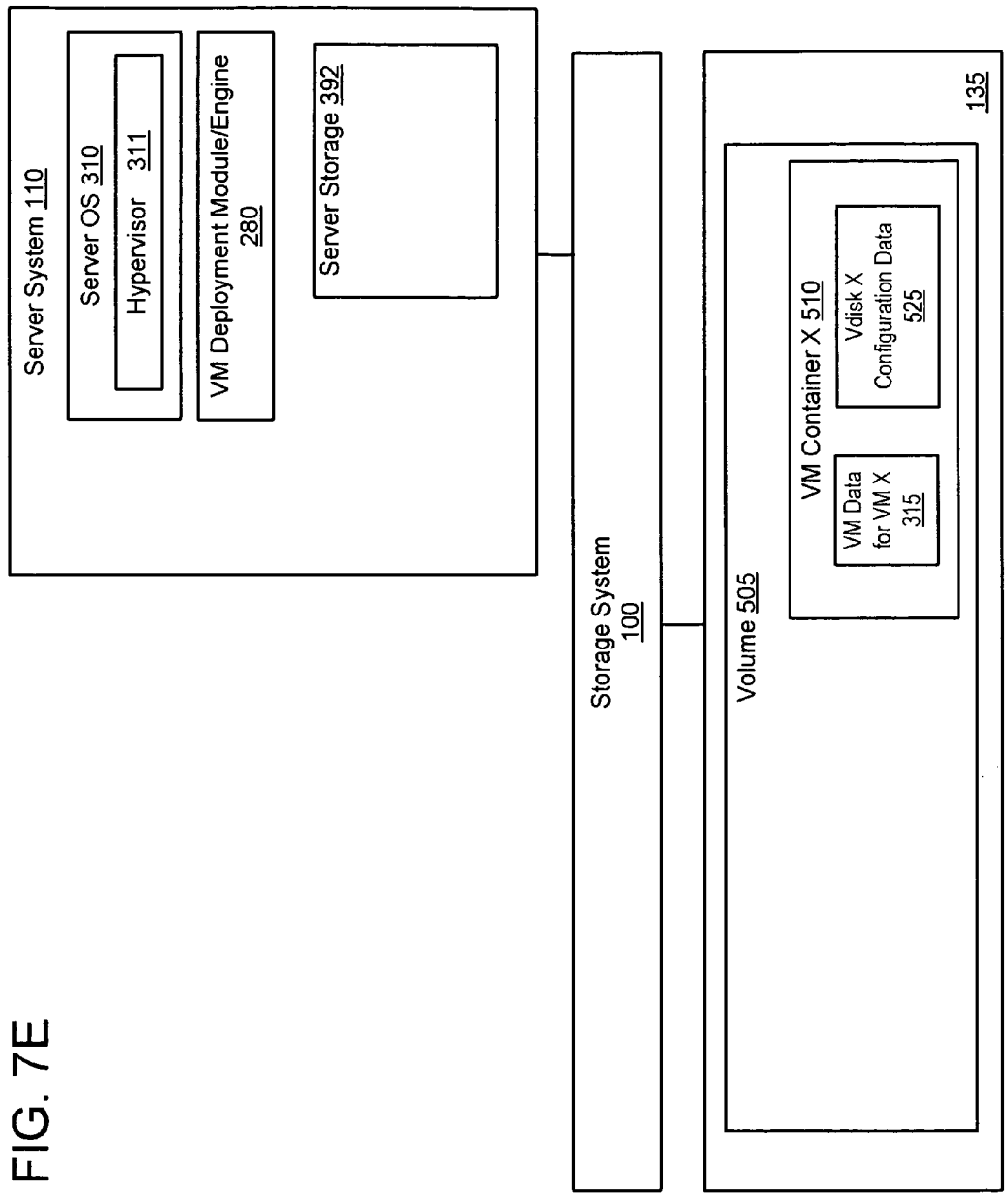

At step 812, the method 800 then produces VM X on the server by importing the VM X data to make the VM X visible on the server 110 (which is conceptually shown in FIG. 7D by "VM X 305" on the server 110). The method 800 may do so by sending a read command to the hypervisor module/engine 311 in the server operation system 310, the command specifying the VM X data to be read. Upon receiving the command, the hypervisor module/engine 311 may read/import the VM X data 315 and produce VM X (based on the VM X data 315) on the server 110. The hypervisor module/engine 311 may then activate/start the VM X 305 for use by a client 160. As such, since the hypervisor module/engine 311 may read the VM X data 315 immediately from the vdisk X, the hypervisor module/engine 311 may produce the VM X rapidly on the server without waiting for the server operating system 310 to configure the vdisk X.

Note that the VM X 305 may be run and maintained from the storage system and the vdisk X 515 may be mapped on the storage system and in use as long as VM X 305 is running and in use on the server 110 by a client 160. At step 814, upon the VM X 305 no-longer running and in use on the server 110 by a client 160, the method 800 then decommissions/removes the VM X 305 on the server 110, and unmaps and destroys the vdisk X 515 on the storage system 100 (which is conceptually shown in FIG. 7E by the now absent VMX 305 and vdisk 515). The method 800 may do so by sending an "remove vdisk map and remove vdisk" command to the storage operating system 200, the command specifying the vdisk to be destroyed. The method 800 then ends.

In further embodiments, in addition to the above steps, the method 800 may also perform the optional step of using a clone vdisk as a precaution to ensure the data in the VM container file X 510 is not inadvertently modified. In these embodiments, after the vdisk X 515 ("original" vdisk) is produced from the VM container file X 510 (at step 806), a snapshot image may be taken of the volume 505 that contains the vdisk X 515 and the VM container file X 510. A snapshot image may comprise a persistent point in time (PPT) image of the data of the volume that enables quick recovery of data after data has been corrupted, lost, or altered. The snapshot image may be produced using Snapshot™ technology provided by NetApp, Inc. of Sunnyvale, Calif. A clone of the vdisk X 515 may then be produced from the snapshot image. The clone vdisk may be produced using Flexclone™ technology provided by NetApp, Inc. of Sunnyvale, Calif. The original vdisk may then be destroyed. The clone vdisk may then be exported and mapped (at 808) to the server and the remaining steps of the method 800 proceed as before. If the original vdisk X 515 is exported and mapped to server, changes in the contents of the vdisk may be reflected in the VM container file X 510, thus modifying the data of the VM container file X 510. To avoid this, the clone vdisk may be exported and mapped to the server and the original vdisk destroyed.

Some embodiments may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module or software layer described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A system comprising:
a server comprising a server operating system, the server being operatively coupled to a storage system and configured for
requesting the storage system to produce a first virtual disk (vdisk) from a container object associated with a virtual machine (VM) and stored in a shared storage operatively coupled to the storage system;
configuring the first vdisk on the server to enable the server access to the first vdisk and produce vdisk configuration data describing the resulting configuration of the first vdisk;
storing the vdisk configuration data and VM data, describing the VM, to the first vdisk, such that the vdisk configuration data and VM data are stored in the container object;
requesting the storage system to produce a second vdisk from the container object, the second vdisk comprising the VM data and vdisk configuration data from the container object;
using the vdisk configuration data of the second vdisk to enable the server operating system immediate access to the second vdisk, such that the VM data of the second vdisk is immediately accessible by the server operating system before producing the VM associated with the container object on the server; and
producing the VM on the server using the VM data from the second vdisk.

2. The system of claim 1, wherein:
the VM produced on the server comprises a separate instance of a separate operating system and one or more applications that execute on the server.

3. The system of claim 1, wherein:
VM data describing a VM specifies hardware or software resources used by the VM; and
vdisk configuration data comprises partitioning data specifying partitioning of the vdisk or formatting data specifying file system formatting for the vdisk.

4. The system of claim 1, wherein the computer hardware is further configured for:
after storing the vdisk configuration data and VM data to the first vdisk, deleting the first vdisk.

5. The system of claim 1, further comprising:
a client system connected with the server and interfacing with the VM on the server to access client data of the storage system, wherein the storage system is operatively coupled to the server for storing client data.

6. A non-transitory computer readable medium having instructions stored thereon for execution by a processor, the computer readable medium comprising sets of instructions for:
requesting a storage system, by a server having a server operating system, to produce a first virtual disk (vdisk) from a container object associated with a virtual machine (VM) and stored in a shared storage operatively coupled to the storage system;

configuring the first vdisk to enable the server access to the first vdisk and produce vdisk configuration data describing the resulting configuration of the first vdisk;

storing the vdisk configuration data and VM data, describing the VM, to the first vdisk, such that the vdisk configuration data and VM data are stored in the container object;

requesting the storage system to produce a second vdisk from the container object, the second vdisk comprising the VM data and vdisk configuration data from the container object;

using the vdisk configuration data of the second vdisk to enable the server operating system immediate access to the second vdisk, such that the VM data of the second vdisk is immediately accessible by the server operating system before producing the VM associated with the container object on the server; and producing the VM on the server using the VM data from the second vdisk.

7. The non-transitory computer readable medium of claim 6, wherein:

the VM produced on the server comprises a separate instance of a separate operating system and one or more applications that execute on the server.

8. The non-transitory computer readable medium of claim 6, wherein:

VM data describing a VM specifies hardware or software resources used by the VM; and vdisk configuration data comprises partitioning data specifying partitioning of the vdisk or formatting data specifying file system formatting for the vdisk.

9. The non-transitory computer readable medium of claim 6, further comprising a set of instructions for, after storing the vdisk configuration data and VM data to the first vdisk, deleting the first vdisk.

10. The non-transitory computer readable medium of claim 6, wherein:

the storage system is connected with the server for storing client data; and a client system is connected with the server and interfaces with the VM on the server to access client data of the storage system.

11. A computer-implemented method comprising:

requesting a storage system, by a server having a server operating system, to produce a first virtual disk (vdisk) from a container object associated with a virtual machine (VM) and stored in a shared storage operatively coupled to the storage system;

configuring the first vdisk to enable the server access to the first vdisk and produce vdisk configuration data describing the resulting configuration of the first vdisk;

storing the vdisk configuration data and VM data, describing the VM, to the first vdisk, such that the vdisk configuration data and VM data are stored in the container object;

requesting the storage system to produce a second vdisk from the container object, the second vdisk comprising the VM data and vdisk configuration data from the container object;

using the vdisk configuration data of the second vdisk to enable the server operating system immediate access to the second vdisk, such that the VM data of the second vdisk is immediately accessible by the server operating system before producing the VM associated with the container object on the server; and producing the VM on the server using the VM data from the second vdisk.

12. The method of claim 11, wherein:

the VM produced on the server comprises a separate instance of a separate operating system and one or more applications that execute on the server.

13. The method of claim 11, wherein:

VM data describing a VM specifies hardware or software resources used by the VM; and vdisk configuration data comprises partitioning data specifying partitioning of the vdisk or formatting data specifying file system formatting for the vdisk.

14. The method of claim 11, further comprising, after storing the vdisk configuration data and VM data to the first vdisk, deleting the first vdisk.

15. The method of claim 11, wherein:

the storage system is connected with the server for storing client data; and a client system is connected with the server and interfaces with the VM on the server to access client data of the storage system.

16. The system of claim 1, wherein VM data on the second vdisk is made accessible to the server without configuring the second vdisk.

17. The non-transitory computer readable medium of claim 6, wherein VM data on the second vdisk is made accessible to the server without configuring the second vdisk.

18. The method of claim 11, wherein VM data on the second vdisk is made accessible to the server without configuring the second vdisk.

19. The system of claim 1, wherein the server is further configured for requesting the storage system to create the container object before requesting the storage system to produce the first vdisk from the container object, the created container object being initially empty.

* * * * *